(12) United States Patent
Wang et al.

(10) Patent No.: US 11,343,660 B2
(45) Date of Patent: May 24, 2022

(54) MOBILE EDGE COMPUTING APPLICATIONS MANAGEMENT FOR WIRELESS NETWORKS

(71) Applicant: NOKIA TECHNOLOGIES OY, Espoo (FI)

(72) Inventors: Zhi Wang, Shandong (CN); Yigang Cai, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/250,140

(22) PCT Filed: Jun. 7, 2018

(86) PCT No.: PCT/US2018/036361
§ 371 (c)(1),
(2) Date: Dec. 4, 2020

(87) PCT Pub. No.: WO2019/236083
PCT Pub. Date: Dec. 12, 2019

(65) Prior Publication Data
US 2021/0243580 A1 Aug. 5, 2021

(51) Int. Cl.
*H04W 4/00* (2018.01)
*H04W 28/24* (2009.01)
(Continued)

(52) U.S. Cl.
CPC ............. *H04W 4/50* (2018.02); *H04L 41/044* (2013.01); *H04L 41/0816* (2013.01);
(Continued)

(58) Field of Classification Search
CPC .............. H04L 41/044; H04L 41/0668; H04L 41/0816; H04L 41/0893; H04L 67/10;
(Continued)

(56) References Cited

U.S. PATENT DOCUMENTS

| 9,432,794 B2 | 8/2016 | Agrawal et al. | |
| 2013/0155873 A1* | 6/2013 | Berg | H04W 12/04 370/242 |

(Continued)

FOREIGN PATENT DOCUMENTS

| WO | 2017100640 A1 | 6/2017 |
| WO | 2017161562 A1 | 9/2017 |
| WO | 2018031070 A1 | 2/2018 |

OTHER PUBLICATIONS

International Preliminary Report on Patentability for PCT Application No. PCT/US2018/036361, dated Jul. 24, 2020, 32 pages.
(Continued)

*Primary Examiner* — Ruolei Zong
(74) *Attorney, Agent, or Firm* — Brake Hughes Bellermann LLP

(57) ABSTRACT

A technique may include receiving, from an external applications controller, by a mobile edge computing applications manager provided on a mobile edge computing server that is in proximity to a radio access network, a mobile edge computing application criteria that includes management rules for managing at least a portion of a lifecycle of a mobile edge computing application; and storing the mobile edge computing application criteria. In an example embodiment, a technique may further include managing at least a portion of a lifecycle of the mobile edge computing application based on the mobile edge computing application criteria.

18 Claims, 8 Drawing Sheets

Example Wireless Network 130

(51) Int. Cl.
*H04W 4/50* (2018.01)
*H04L 41/044* (2022.01)
*H04L 41/0816* (2022.01)
*H04L 41/0893* (2022.01)
*H04L 67/10* (2022.01)
*H04L 67/00* (2022.01)
*H04L 69/24* (2022.01)
*H04W 28/26* (2009.01)

(52) U.S. Cl.
CPC .......... *H04L 41/0893* (2013.01); *H04L 67/10* (2013.01); *H04L 67/34* (2013.01); *H04L 69/24* (2013.01); *H04W 28/24* (2013.01); *H04W 28/26* (2013.01)

(58) Field of Classification Search
CPC .......... H04L 67/34; H04L 69/24; H04W 4/50; H04W 28/24; H04W 28/26
USPC ........................................................ 455/414
See application file for complete search history.

(56) References Cited

U.S. PATENT DOCUMENTS

| | | | | |
|---|---|---|---|---|
| 2013/0265936 | A1* | 10/2013 | Berg | H04W 8/082 370/328 |
| 2014/0297822 | A1* | 10/2014 | Agrawal | H04L 41/5051 709/223 |
| 2017/0034643 | A1* | 2/2017 | Young | H04W 4/02 |
| 2017/0118311 | A1 | 4/2017 | Frydman et al. | |
| 2017/0251368 | A1 | 8/2017 | Ross et al. | |
| 2018/0049179 | A1* | 2/2018 | Shah | H04L 67/12 |
| 2018/0183855 | A1* | 6/2018 | Sabella | G06F 9/505 |
| 2020/0099742 | A1* | 3/2020 | Puente | H04L 67/1021 |
| 2020/0288302 | A1* | 9/2020 | Feng | H04W 40/04 |
| 2021/0203715 | A1* | 7/2021 | Han | H04L 67/10 |

OTHER PUBLICATIONS

International Search Report and Written Opinion for International Application No. PCT/US2018/036361, dated Feb. 14, 2019, 15 pages.
Carrega et al.; "A Middleware for Mobile Edge Computing"; IEEE Cloud Computing; vol. 4, Issue 4; Jul./Aug. 2017; pp. 26-37.
Dongmin, Yin; "Getting Close to You: MEC@CloudEdge"; Solutions; Issue 82; Feb. 2017; pp. 38-41.
Giust et al., "MEC Deployments in 4G and Evolution Towards 5G"; EISI White Paper No. 24; First Edition; Feb. 2018; 24 pages.
Mach et al.; "Mobile Edge Computing: A Survey on Architecture and Computation Offloading", IEEE Communications Surveys & Tutorials; vol. 19, Issue 3; Mar. 13, 2017; pp. 1628-1656.
Schiller et al., "CDS-MEC: NFV/SDN-based Application Management for MEC in 5G Systems", Computer Networks; vol. 135; Apr. 22, 2018; pp. 96-107.
Wang et al.; "ENORM: A Framework for Edge NOde Resource Management"; IEEE Transactions on Services Computing; vol. X No. Y; Jan. 2017; pp. 1-14.
Office Action for European Application No. 18735459.2, dated Sep. 28, 2021, 5 pages.

* cited by examiner

MOBILE EDGE COMPUTING APPLICATIONS MANAGEMENT FOR WIRELESS NETWORKS

CROSS-REFERENCE TO RELATED APPLICATIONS

This application is a national stage entry of International Application No. PCT/US2018/036361, filed Jun. 7, 2018, entitled "MOBILE EDGE COMPUTING APPLICATIONS MANAGEMENT FOR WIRELESS NETWORKS" which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. For example, ultra-reliable and low-latency communications (URLLC) devices may require high reliability and very low latency.

SUMMARY

According to an example embodiment, a method includes receiving, from an external applications controller, by a mobile edge computing applications manager provided on a mobile edge computing server that is in proximity to a radio access network, a mobile edge computing application criteria that includes management rules for managing at least a portion of a lifecycle of a mobile edge computing application; and storing the mobile edge computing application criteria.

According to an example embodiment, an apparatus includes at least one processor and at least one memory including computer instructions, when executed by the at least one processor, cause the apparatus to receive, from an external applications controller, by a mobile edge computing applications manager provided on a mobile edge computing server that is in proximity to a radio access network, a mobile edge computing application criteria that includes management rules for managing at least a portion of a lifecycle of a mobile edge computing application; and store the mobile edge computing application criteria.

According to an example embodiment, a non-transitory computer-readable storage medium includes instructions stored thereon that, when executed by at least one processor, are configured to cause a computing system to perform a method of receiving, from an external applications controller, by a mobile edge computing applications manager provided on a mobile edge computing server that is in proximity to a radio access network, a mobile edge computing application criteria that includes management rules for managing at least a portion of a lifecycle of a mobile edge computing application; and storing the mobile edge computing application criteria.

According to an example embodiment, a method includes sending, by an external applications controller to a mobile edge computing applications manager provided on a mobile edge computing server that is in proximity to a radio access network, a proposed mobile edge computing application criteria that includes management rules for managing at least a portion of a lifecycle of a mobile edge computing application.

According to an example embodiment, an apparatus includes at least one processor and at least one memory including computer instructions, when executed by the at least one processor, cause the apparatus to send, by an external applications controller to a mobile edge computing applications manager provided on a mobile edge computing server that is in proximity to a radio access network, a proposed mobile edge computing application criteria that includes management rules for managing at least a portion of a lifecycle of a mobile edge computing application.

An apparatus comprising at least one processor and at least one memory including computer instructions, when executed by the at least one processor, cause the apparatus to: receive, from an external applications controller, by a mobile edge computing applications manager provided on a mobile edge computing server that is in proximity to a radio access network, a proposed mobile edge computing application criteria that includes management rules for managing at least a portion of a lifecycle of a mobile edge computing application; determine, by the mobile edge computing applications manager, that the proposed mobile edge computing application criteria is feasible; send, by the mobile edge computing applications manager to the external applications controller, a confirmation indicating that the proposed mobile edge computing application criteria is feasible; and manage, by the mobile edge computing applications manager, at least a portion of a lifecycle of the mobile edge computing application based on the mobile edge computing application criteria. According to an example embodiment, a method is provided The details of one or more examples of embodiments are set forth in the accompanying drawings and the description below. Other features will be apparent from the description and drawings, and from the claims.

DETAILED DESCRIPTION

Figure 1:
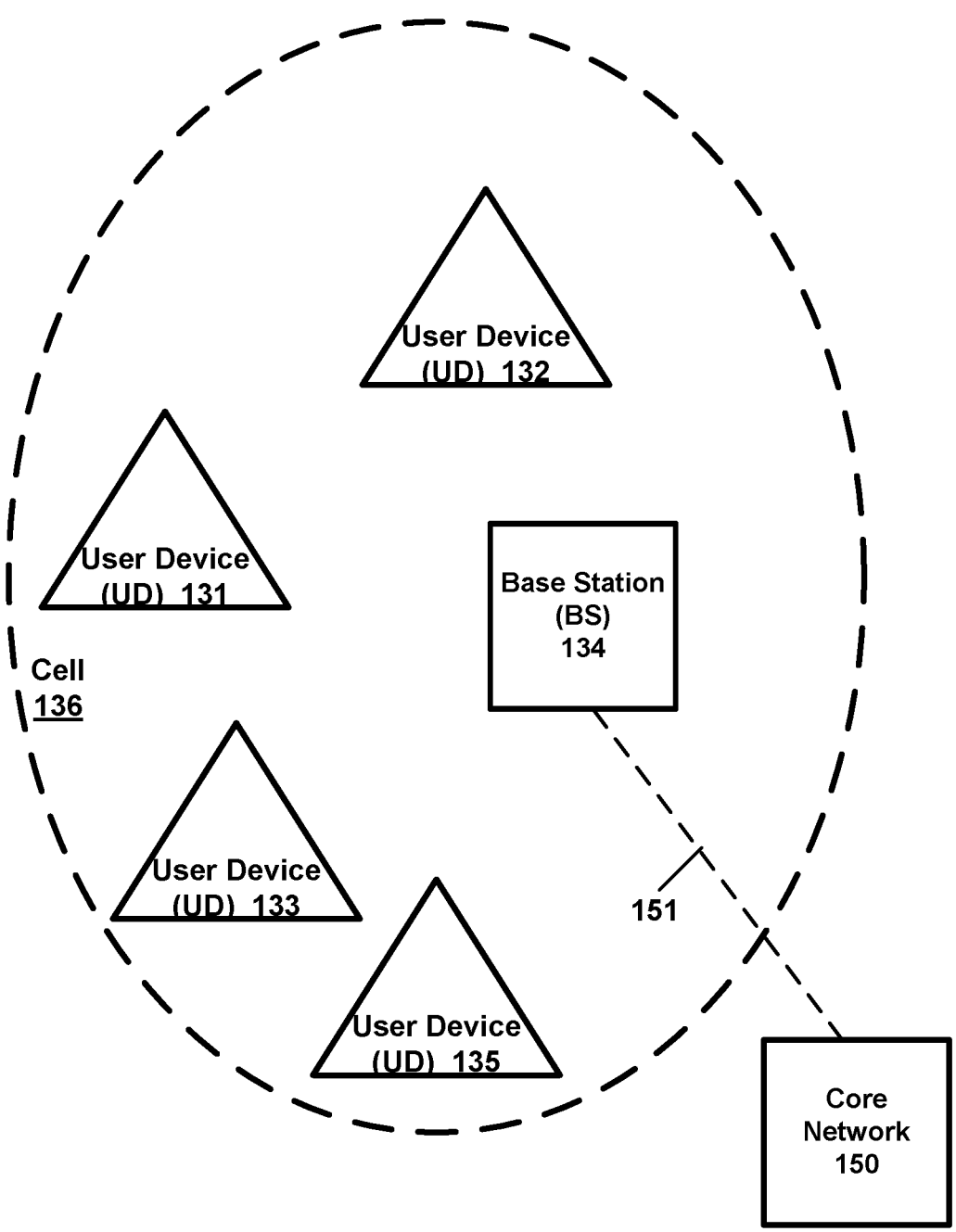
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

As noted, 5G technologies are expected to significantly increase data rates (or bandwidths) and/or decrease latency. However, many network, cloud or IT applications or services may typically be running (or hosted) on a server that may be located hundreds or even thousands of miles away from UEs or mobile subscribers. For example, such a large distance between a server hosting an application or service and a UE or mobile subscriber that may be receiving the service may add significant latency to the user experience, and for some applications, may also cause an inefficient use of network resources.

Therefore, according to an example embodiment, Mobile Edge Computing (MEC) is an emerging technology in 5G era which enables the provision of the cloud and IT services or applications within the proximity of mobile subscribers. It allows the availability of the cloud or application servers in proximity to the BS (e.g., a MEC server within or as part of the BS, a MEC server provided within the enclosure(s) or building(s) where the BS equipment is located, or a MEC server very near to the BS, such as, for example, within 10-15 meters or so of the BS equipment).

For example, by providing an application on a MEC server (which may be referred to as a MEC application), the end-to-end latency perceived by the mobile user is therefore reduced with the MEC platform. For example, augmented reality (AR)/virtual reality (VR) applications or services provided to mobile users or UEs may require a relatively low latency (e.g., 20 ms), and an AR/VR service having a latency that is much higher may cause VR sickness. Therefore, for example, providing an AR/VR application running on MEC server that is in proximity to a BS may dramatically reduce latency experienced by the UE or mobile user. A number of other applications may require low latency (and thus, may benefit from an application providing a service that is hosted on a MEC server that is in proximity to the BS) may include, for example, Internet of Vehicles, autonomous driving, industrial control, fast-twitch Internet video games, etc.

Also, some types of applications may significantly reduce both latency and bandwidth consumption by hosting the service or application on a MEC server in proximity to the BS. As an illustrative example, a video streaming service may deliver a 20 MB viral video to 1000 users, which would produce 20 GB of network traffic over the Internet and other networks, due to the video being separately transmitted to each UE or mobile user. However, in an example embodiment, the video streaming service may provide a video streaming application (and a cached version of the viral video) on a MEC server in proximity to a BS, in order to significantly reduce network bandwidth and latency in the delivery of the video to those 1,000 UEs or mobile users, for example. Thus, for example, in order to support services with very strict latency, and/or to more efficiently deliver content to multiple mobile users or UEs, it may be advantageous to move such applications or services closer to the mobile subscriber or UE that is receiving such service. These are merely a few examples of services that may benefit from having their application hosted on a MEC server within a radio access network (RAN), such as in proximity to a BS, e.g., to be much closer to mobile end-users of such services, e.g., UEs or mobile subscribers.

Thus, it can be seen that for some applications or services, it may be quite valuable to provide or host such application or service on a MEC server in proximity to the BS based on the proximity to the mobile subscribers or UEs that may be receiving such services (e.g., based on reduced latency and/or a more efficient use of network resources). Furthermore, because physical space within and/or in proximity to the BS enclosure or building is limited (thus, limiting the number of MEC servers that may be provided in proximity to the BS), and because resources (e.g., processing resources, memory, and other resources) on such MEC servers are also quite limited, MEC server resources may be quite limited. Thus, based on the demand for MEC applications (applications instantiated or provided on a MEC server in proximity to a BS) and the limited MEC server resources, the mobile network operator (MNO) may offer to host such external (e.g., third-party) applications (e.g., non-MNO applications) on a MEC server(s) in return for compensation (e.g., based on a charging rate) from the external or third-party service providers that own and/or control such external applications or services.

According to an example embodiment, a MEC server may receive requests from external service providers to instantiate their external (or third-party) applications (or MEC applications) on a MEC server(s). The MEC server may then grant or deny the request to instantiate the application. Various messages may be sent back and forth between the external service provider or application owner (who controls the service or application) and the MEC server to allow the MEC server to instantiate the external application and/or scale (or increase) resources for such application, and/or to inform the external service provider that the MEC server is unable to instantiate the application, etc. As a result, this may create significant overhead and delay between these entities.

MEC enables operators to open their Radio Access Network (RAN) edge to authorized third-parties (or external service providers), allowing them to flexibly and rapidly deploy innovative applications and services towards mobile subscribers, enterprises and vertical segments. In an example embodiment, a MEC server may receive requests from an external service provider via a CFS (Customer Facing Service) portal or from UE applications for instantiation or termination of applications, and decides on the granting of these requests.

However, this approach to MEC applications management may not provide an efficient management of MEC applications, e.g., where a MEC application may include an external or third-party (e.g., non-MNO) application that is hosted or instantiated on a MEC server. As noted, a significant amount of signaling or message overhead may be required to instantiate or terminate each application on a MEC server, which may result in an inefficient process. Also, while the application service provider (application owner or application controller) may know the conditions under which it would like to instantiate or terminate its application on a MEC server, the application service provider (application owner) may not have access to such information (e.g., charging rates, network conditions, availability of MEC resources, and the like). For example, an application owner (or application service provider) may want to deploy a MEC application at a low cost and/or during specific network conditions. Thus, while a MEC server can receive requests from the external (or third-party or non-MNO) application owner or application service provider via a CFS (Customer Facing Service) portal or from a UE for instantiation or termination of an application, the external (or third-party) application owner may be unable to determine the best times or opportunities for such application instantiation or termination, e.g., because the external (e.g., third-party) application owner may typically not have access to all the relevant information.

In another example, the MNO may want to guide or encourage external or third-party application owners to trigger or request instantiation of applications when there are idle or available MEC resources (e.g., at a MEC server). However, a problem arises in that MEC server resources may be very busy at some times, and MEC server resources may be available or under-utilized at other times. Thus, to allow the MNO to generate more revenue and to allow external or third-party application owners to be able to request application instantiation at a MEC server when MEC resources are available and/or when a resource charging rate may be low. Similarly, it may be desirable to replace a low value (or low priority) application with a higher value (or higher priority) application at the MEC server, e.g., when MEC resources are very limited.

As noted, there may be several problems that may arise in the context of MEC applications management. One or more of these problems or issues may be addressed or improved by the system and/or techniques described herein, including the following example issues:

1) For example, an application owner may want to deploy a MEC application according to specific conditions, such as a specific cost or charging rate(s), times, etc. A MEC server may receive requests via a CFS (Customer Facing Service) portal or from UE applications for instantiation or termination of applications. However, in some cases, external or third-party application owners may be unable to determine the best opportunities for such application instantiation or operation at a MEC server (e.g., because the application owner may not have access to updated conditions for the MEC server, and/or due to other limitations).

2) Idle MEC resources (e.g., where there are idle or available MEC resources) present an under-utilization of valuable MEC resources. As described herein, the MNO (or operator), or MEC applications manager, may want to guide/encourage third-party application owners to trigger or request application instantiation when MEC resources are idle or become available, e.g., to improve MEC resource usage.

3) Also, a limited MEC resource scenario may occur. If the mobile network operator (MNO), or the MEC server, is unable to make changes or adjustments based on a varying (e.g., increasing) demand for resources or limited MEC resource scenario, then the operator may not be obtaining the maximum value for the limited MEC resources.

Figure 2:
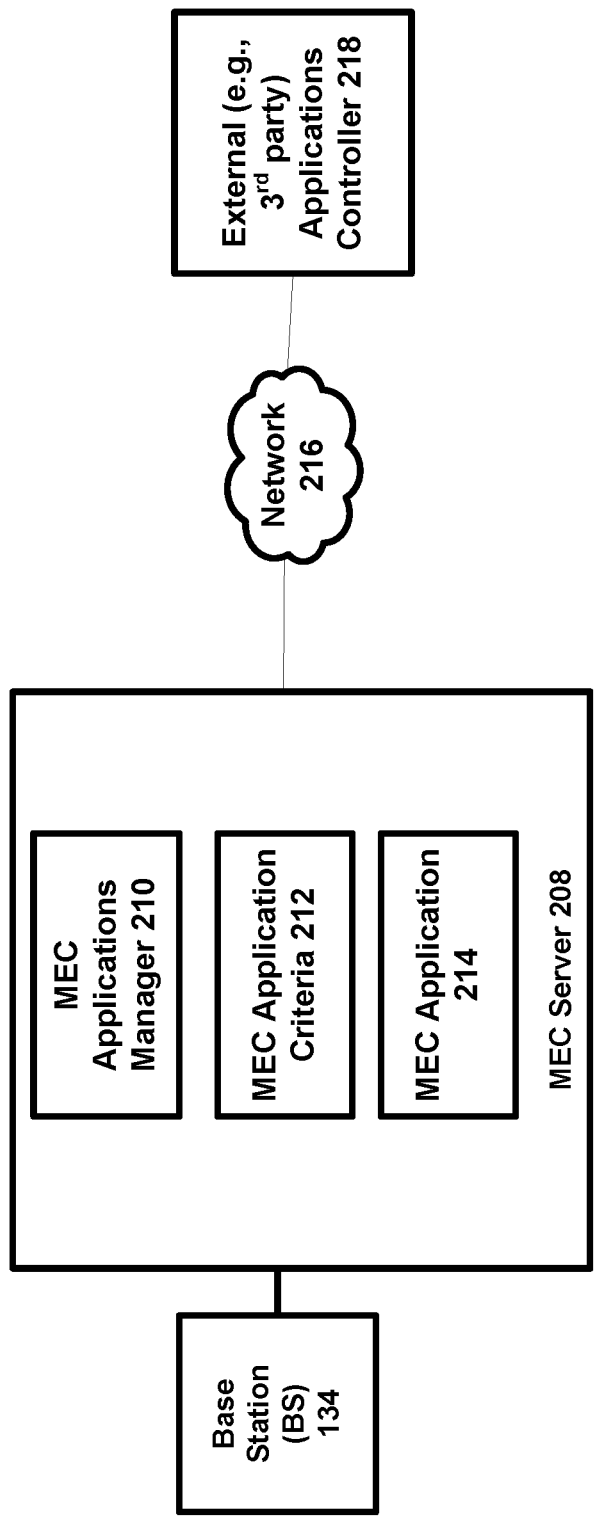
FIG. 2 is a diagram illustrating a system according to an example embodiment.

FIG. 2 is a diagram illustrating a system according to an example embodiment. As shown in FIG. 2, a MEC server 208 is a mobile edge computing server, and may be provided at the edge of the RAN (radio access network) network (e.g., at or near a BS). A RAN may include one or more BSs, and/or may include BSs and one or more UEs. With reference to FIG. 2, MEC server 208 may be in proximity to a BS 134. By way of illustrative example, providing a MEC server 208 (including one or more applications running thereon) in proximity to a BS 134, may include, e.g., a MEC server 208 within or as part of the BS, a MEC server provided within the enclosure(s) or building(s) where the BS equipment is located, or a MEC server that is very near to the BS (e.g., within about 10-15 meters of the BS equipment, for example). Other examples of proximity may be used as well. As noted above, by providing a MEC server (and any applications running thereon) in proximity to a BS, and thus, near the UEs or mobile subscribers, may provide one or more advantages, such as allowing service providers to delivery their services to the mobile end-users with lower latency, and/or in a more network-efficient manner.

MEC server 208 may also include one or more applications running or hosted on the MEC server 208, e.g., including a MEC application 214. A MEC application may include, for example, an application that is hosted or running on a MEC server (which may be in proximity to a BS, and thus, relatively near UEs or mobile subscribers). In an illustrative example embodiment, the MEC application 214 may include an external (or third-party, or non-mobile network operator) application that is running on the MEC server 208. A mobile network operator (MNO) may operate the wireless network, including the BSs, core network 150, etc. The MNO may allow external or third-party (non-MNO) applications to be hosted or run on the MEC server. For example, an external (or third-party) application may include a non-mobile network operator (non-MNO) application, or an application that is owned and/or controlled by an external or third party (e.g., an application that may be owned or controlled by an entity or company other than the MNO that operates the mobile or wireless network. Some examples of MEC applications may include an augmented reality/virtual reality (AR/VR) application, a video delivery service or application, a data collection application, an automated driving application, a social media application, a video game application, a factory automation application, etc. According to an example embodiment, while a MNO may have one or more (e.g., telecommunications-related) applications running on a server (computer) at the BS 208, MEC applications may include external or third-party (e.g., non-MNO) applications that the MNO may host or run on a MEC server(s) in return for compensation (based on a charging rate or resource charging rate) from the MEC application owner or MEC application controller. Thus, for example, by making available its MEC resources to external (or third-party) applications, the MNO, for example, may obtain income based on a lease or rent of MEC resources, while the external applications owner or controller may advantageously obtain resources that allow an application to be run at a location that is in proximity to a BS, e.g., which may provide UEs with lower latency, more efficient network usage, or other advantage(s). Various techniques are described herein that may provide improved management of MEC applications.

Also, as shown in FIG. 2, a MEC applications manager 210 may be provided, e.g., on MEC server 208, or at another storage location that may or may not be in proximity to the BS 134. MEC applications manager 210 may manage the operation and/or lifecycle of one or more MEC applications 214. According to an example embodiment, a MEC application criteria 212 may be provided for each of one or more MEC applications. Thus, MEC application criteria 212 may be provided (or associated with) MEC application 214, for example. Each MEC application criteria 212 may be stored on a MEC server, e.g., such as on MEC server 208, or at another location, and/or on a same (or different) server that MEC applications manager 210 is stored. According to an example embodiment, the MEC application criteria 212 may include management rules for managing the operation and/or at least a portion of a lifecycle of an associated application (s). Thus, there may be one or more MEC applications that are associated with each stored MEC application criteria 212. In an example embodiment, MEC applications manager 210 may manage or control the operation and/or lifecycle of the MEC application(s) 214 based on MEC application criteria 212 associated with the MEC application 214.

According to an example embodiment, the managing at least a portion of a lifecycle of a MEC application may include performing, and/or determining whether to perform, one or more of the following based on a comparison of the MEC application criteria 212 to one or more conditions associated with the lifecycle management of the MEC application 214: instantiating the mobile edge computing application; terminating the mobile edge computing application; scaling up (e.g., increasing) resources allocated to the mobile edge computing application; and scaling down (e.g., decreasing) resources allocated to the mobile edge computing application. Thus, according to an example embodiment, some example phases or cycles of a lifecycle for an application may include, e.g., instantiation of an application, termination of the application, scaling up and/or scaling down of resources for the application. These are some illustrative examples, and the MEC applications manager 210 may perform other functions or tasks to manage or control a MEC application 214 based on a MEC application criteria 212.

Also, referring to FIG. 2, an external (e.g., third-party or non-MNO) applications controller 218 may be provided, e.g., by the application owner or other entity associated with the MEC application 214 that is run or hosted on the MEC server 208. The external applications controller 218 may be coupled to (or in communication with) MEC server 208 via a network 216. Thus, according to an example embodiment, to improve the management of MEC applications, external applications controller 218 may determine and send to MEC applications manager 210 a proposed MEC application criteria 212 for one or more MEC applications (e.g., such as for managing MEC application 214). According to an example embodiment, the MEC applications manager 210 may receive the proposed MEC application criteria 212 from the external (e.g., third-party) applications controller 218.

According to an example embodiment, a mobile edge computing (MEC) applications manager 210 (e.g., provided on a server that is in proximity to a radio access network) may receive, from an external applications controller 218, a MEC application criteria 212 that includes management rules for managing at least a portion of a lifecycle of a MEC application 214; and store the mobile edge computing application criteria. Also, for example, the MEC applications manager 210 may manage at least a portion of a lifecycle of the MEC application 214 based on the MEC application criteria 212.

In another example embodiment, the MEC applications manager 210 may determine a feasibility of a proposed MEC application criteria. If the proposed MEC application criteria 212 is determined as feasible, then the MEC applications manager 210 may store the MEC application criteria 212, e.g., in a database or other storage location, and may control or manage the operation and/or at least a portion of a lifecycle of the associated application(s) 214 based on the stored MEC application criteria 212.

In an example embodiment, MEC applications manager 210 may determine a feasibility of the proposed MEC application criteria, e.g., based on: comparing one or more parameters of the proposed MEC application criteria to one or more constraints associated with the MEC applications management; determining a feasibility of the proposed MEC application criteria, as one of the following: determining, based on the comparing, that the proposed MEC application criteria is not feasible based on a determination that the one or more parameters of the proposed mobile edge computing application criteria violate the one or more constraints associated with the mobile edge computing applications management; and determining, based on the comparing, that the proposed MEC application criteria is feasible based on a determination that the one or more parameters of the proposed MEC application criteria do not violate the one or more constraints associated with the mobile edge computing applications management.

Thus, the MEC applications manager 210 may, e.g.: receive, by a MEC applications manager 210 provided on a MEC server that is in proximity to a radio access network (e.g., in proximity to a BS) from an external applications controller 218, a proposed MEC application criteria that includes (proposed) management rules for managing at least a portion of a lifecycle of a MEC application; determine, by the MEC applications manager 210, a feasibility of the proposed MEC application criteria; and storing, e.g., if the proposed MEC application criteria is feasible, the proposed MEC application criteria in a database for use in managing the MEC application. The MEC applications manager 210 may further manage, if the proposed MEC application criteria 212 is feasible, at least a portion of a lifecycle of the MEC application 214 based on the proposed MEC application criteria.

In the event that the MEC applications manager 210 determines that the MEC application criteria 212 is not feasible, then a negotiation may be performed between the MEC applications manager 210 and the external applications controller 218 to agree on a revised MEC application criteria that is feasible. For example, the MEC applications manager 210 may further perform the following if the proposed MEC application criteria is not feasible: negotiating, by the MEC applications manager 210 with the external applications controller 218, to agree on a revised MEC application criteria that is feasible; storing the revised MEC application criteria in a database for use in managing the MEC application 214; storing the revised MEC application criteria; and, managing, by the MEC applications manager 210, at least a portion of a lifecycle of the MEC application 214 based on the revised MEC application criteria.

In an example embodiment, the negotiating a revised MEC application criteria, e.g., if the proposed MEC application criteria is not feasible, may include the following: sending, by the MEC applications manager 210 to the external applications controller 218, a revised MEC application criteria that includes at least one MEC application criteria parameter that is different than the proposed MEC application criteria and which renders the revised MEC application criteria as feasible; receiving, by the MEC applications manager 210 from the external applications controller 218, a confirmation of the revised MEC application criteria (e.g., acknowledging or confirming that the revised MEC application criteria is acceptable). The MEC applications manager 210 may then manage at least a portion of the lifecycle of the MEC application 214 based on the revised MEC application criteria.

In an example embodiment, one or more conditions may arise or be detected by the MEC applications manager 210 where it would be desirable to have one or more external applications controllers to request use of MEC resources for external application (s), e.g., to request instantiation of an application and/or increase in resources for such application running on the MEC server. For example, MEC applications manager 210 may detect idle or available resources on the MEC server(s) 208 (e.g., processing, memory or other MEC resources, or idle MEC resources that are greater than a threshold), or detect that a charging rate for MEC resources is less than a threshold, or detect that demand for MEC resources has decreased or is less than a threshold. In such a case, for example, the MEC applications manager 210 may send information (e.g., a request or offer or suggestion, such as an offered MEC application criteria) to an external applications controller 218 to prompt the external applications controller 218 to send a (e.g., proposed) MEC application criteria 212 to MEC applications manager 210. In this example, by sending a suggesting an offered MEC application criteria to the external applications controller 218, the MEC applications manager 210 may attempt to facilitate the usage of idle or available MEC resources on one or more MEC servers. In such a case, the proposed MEC application criteria 212 sent by the external applications controller 218 may be sent in response to receiving an offered MEC applications criteria (e.g., the proposed MEC application criteria may be sent in response to a request or suggestion from the MEC applications manager 210, for example). In other example embodiments, a proposed MEC application criteria may be sent by external applications controller 218, e.g., without any suggestion or prompting from MEC applications manager 210.

According to an example embodiment, the MEC application criteria 212 may include an application identifier that identifies the MEC application; and a value for one or more parameters for managing at least a portion of a lifecycle of the MEC application, including an action criteria and an associated action to be performed for the MEC application if the action criteria is met.

According to an example embodiment, the MEC application criteria 212 may include at least one of the following: a first threshold for determining one or more conditions to instantiate the MEC application; a second threshold for determining one or more conditions to scale up or increase resources for the MEC application; a third threshold for determining one or more conditions to scale down or decrease resources allocated to the MEC application; and a fourth threshold for determining one or more conditions to terminate the MEC application.

For example, four (or other number of) different charging rate thresholds may be indicated by a MEC application criteria 212. For example, the MEC application criteria may indicate that: if a MEC resource charging rate is less than a first charging rate threshold, then the MEC applications manager 210 is requested to instantiate the corresponding application; if a MEC resource charging rate is less than a second charging rate threshold, then the MEC applications manager 210 is requested to increase resources for a corresponding application that has already be instantiated; if a MEC resource charging rate is greater than a third charging rate threshold, then the MEC applications manager 210 is requested to decrease resources for a corresponding application; and, if a MEC resource charging rate is greater than a fourth charging rate threshold, then the MEC applications manager 210 is requested to terminate the corresponding application that has already be instantiated.

Therefore, the external applications controller 218 may be able to indicate, within a MEC application criteria 212, one or more actions that are to be performed for the application, and the criteria or conditions under which such actions should take place (e.g., without requiring any further signaling or communication between the external applications controller 218 and MEC applications manager 210). In this manner, while the external applications controller 218 may not have access to a variety of network conditions, current rates or resource availability at a MEC server, the external applications controller is able to determine the requested actions for its application(s) and under what condition or criteria such actions would be performed, and then communicate this information, e.g., in the form of a MEC application criteria, to the MEC applications manager 210, so that the MEC applications manager 210 may control or manage the operation and/or control or manage at least a portion of the lifecycle of the application based on the (approved or feasible) MEC application criteria 212.

According to an example embodiment, MEC application criteria 212 may include at least one of the following, for example: a first charging rate threshold for determining a range of charging rates, for which the MEC applications manager is being requested to instantiate the MEC application; a second charging rate threshold for determining a range of charging rates, for which the MEC applications manager is being requested to scale up resources for the MEC application; a third charging rate threshold for determining a range of charging rates, for which the MEC applications manager is being requested to scale down resources for the MEC application; and, a fourth threshold for determining one or more conditions, for which the MEC applications manager is being requested to terminate the MEC application.

According to an example embodiment, MEC application criteria 212 may include a value for one or more of the following parameters for managing at least a portion of a lifecycle of the MEC application 214: a valid timer parameter that identifies a time period for which the MEC application criteria is valid; a charging rate threshold for determining whether to perform one or more actions or cycles of the lifecycle management of the MEC application; a memory resource, a processing resource, or a bandwidth resource, requested for the MEC application; an amount of bandwidth resources requested for the MEC application; a requested performance for the MEC application related to at least one of a latency, a minimum bandwidth or data throughput, or a quality of service; and a radio network information service (RNIS) information related to a user device or a radio access bearer for the user device.

According to an example embodiment, MEC application criteria 212 may specify a network condition (e.g., a charging rate less than a first threshold, or greater than a third threshold, or a threshold amount of MEC resources are idle or available, demand for MEC resources are less than a threshold, or greater than a threshold, or performance of the MEC server or MEC server resource(s) are above or below a threshold, . . . ) and an associated action (e.g., instantiate an application, scale up or down resources, and/or terminate the application, or other action) to be performed for the MEC application when the network condition is met, and wherein the managing at least a portion of a lifecycle of the MEC application may include, for example: determining that the network condition is met; performing the associated action for the MEC application based on the network condition being met, wherein the associated action includes one of: instantiate the MEC application, terminate the MEC application, scale up resources for the MEC application, and scale down resources for the MEC application.

Also, the MEC applications manager 210 may detect a change in one or more network conditions (e.g., an increase in available MEC resources, a decrease in available MEC resources below a threshold, a charging rate that is less than a threshold or greater than a threshold, . . . ). For example, the MEC applications manager 210 may detect a change in network conditions related to at least one of a change in an availability of MEC server resources or a change in demand for MEC server resources. In another example embodiment, the detecting a change in network conditions may include, e.g., at least one of: detecting an increase or decrease in MEC server resources; detecting a change in a charging rate(s) to be charged for the MEC application; and detecting a change in demand for MEC server resources based on resource requests for other MEC applications.

In response to detecting this change in network condition(s), the MEC applications manager may send, to the external applications controller 218, a revised MEC application criteria based on the detected change in network conditions. For example, an initial MEC application criteria 212 from external applications controller 218 was (at least initially) feasible and thus accepted by the MEC applications manager to provide a first (e.g., high) level of MEC resources for an application at a first (e.g., low) charging rate. However, due to an increase in demand or requests for MEC server resources and/or an increase in MEC server resource charging rates, the initial MEC application criteria is no longer feasible (e.g., no longer possible and/or no longer desirable for the MEC applications manager), and/or is now less profitable than proposed MEC application criteria received from or negotiated for other applications, and/or is for a lower priority or a lower value application as compared to a more recently received offered MEC applications criteria for another application.

Thus, in order to allocate more MEC resources for higher value (e.g., higher priority and/or higher paying) applications, the MEC applications manager 210 may send a message to the external applications controller 218 to terminate an initial (or previously agreed) MEC application criteria for a low value (e.g., a low priority application or lower paying) application (and/or to renegotiate to provide MEC resources at a higher charging rate or cost, by providing a revised MEC application criteria), so that, e.g., this may free up those MEC resources that may be allocated for the instantiation (and/or scaling up of resources) for a higher value (e.g., higher priority or higher paying) MEC application and/or to increase MEC resource rental fee income to the MNO, for example. Thus, for example, a value of an application may be determined by a number of different criteria, such as a priority of the application and/or a rate that the application is being charged for MEC resources (e.g., paying rate or charging rate), or other criteria. Thus, for example, when conditions change, the MEC applications manager may take steps to reallocate MEC resources to a higher value application, or to negotiate a revised MEC application criteria (e.g., at a higher charging rate) with the current application or external applications controller that was previously allocated such MEC resources.

By way of illustrative example, a driving automation (self-driving) application (e.g., to facilitate or assist a self-driving car or vehicle) may be considered a higher priority than a video streaming application, e.g., due to a higher priority for public safety. Also, a higher value application may also be an application for which a higher charging rate for MEC resources may be available (from the same or a different MEC applications controller or application), e.g., in order to increase income for the mobile network operator (MNO) based on the renting or leasing of the limited MEC resources in proximity to the RAN (e.g., in proximity to a BS).

Various example embodiments may provide a dynamic Third-Party MEC applications management. For example, an application owner generated MEC application criteria 212 may define the context-dependent MEC applications management rules for the MEC application management. The MEC application criteria 212 may be downloaded to a MEC server for dynamic MEC application management by the MEC applications manager 210. According to an example embodiment, a MEC applications manager 210 may be provided, e.g., on a MEC server 208, e.g., to manage or control a MEC application based on the corresponding MEC application criteria 212. In an example embodiment, the MEC applications manager 210 may determine a feasibility of an application owner-proposed MEC application criteria. If the proposed MEC application criteria is not feasible (or not approved by the MEC applications manager 210), a MEC application criteria negotiation is triggered between application owner (or the external applications controller 218 on behalf of the application owner) and MEC applications manager 210 until a revised (and feasible or approved) MEC application criteria is agreed upon between the parties, e.g., based on the knowledge of both MEC applications manager 210 and the application owner or external applications controller 218.

The MEC applications manager 210 may also guide the application owner or external applications controller 218 by performing appropriate applications management operations. For example, in a MEC resource idle scenario (e.g., where there are idle or available MEC server resources), the MEC applications manager 210 on a MEC server 208 may begin or initiate negotiation (e.g., by sending an offered or suggested MEC application criteria) with external applications controller 218 to trigger an application instantiation for revenue generation for the MNO.

In a MEC resource limited scenario (e.g., where MEC server resources are scarce or unavailable), the MEC applications manager 210 may identify the applications having a low (or lowest) value and trigger negotiation with third-party application owner (e.g., external applications controllers) for these low value application(s) to dynamically replace such applications with higher value applications. For example, higher value applications may include, e.g., applications that may be higher priority and/or applications that provide or pay a higher charging rate.

Figure 3:
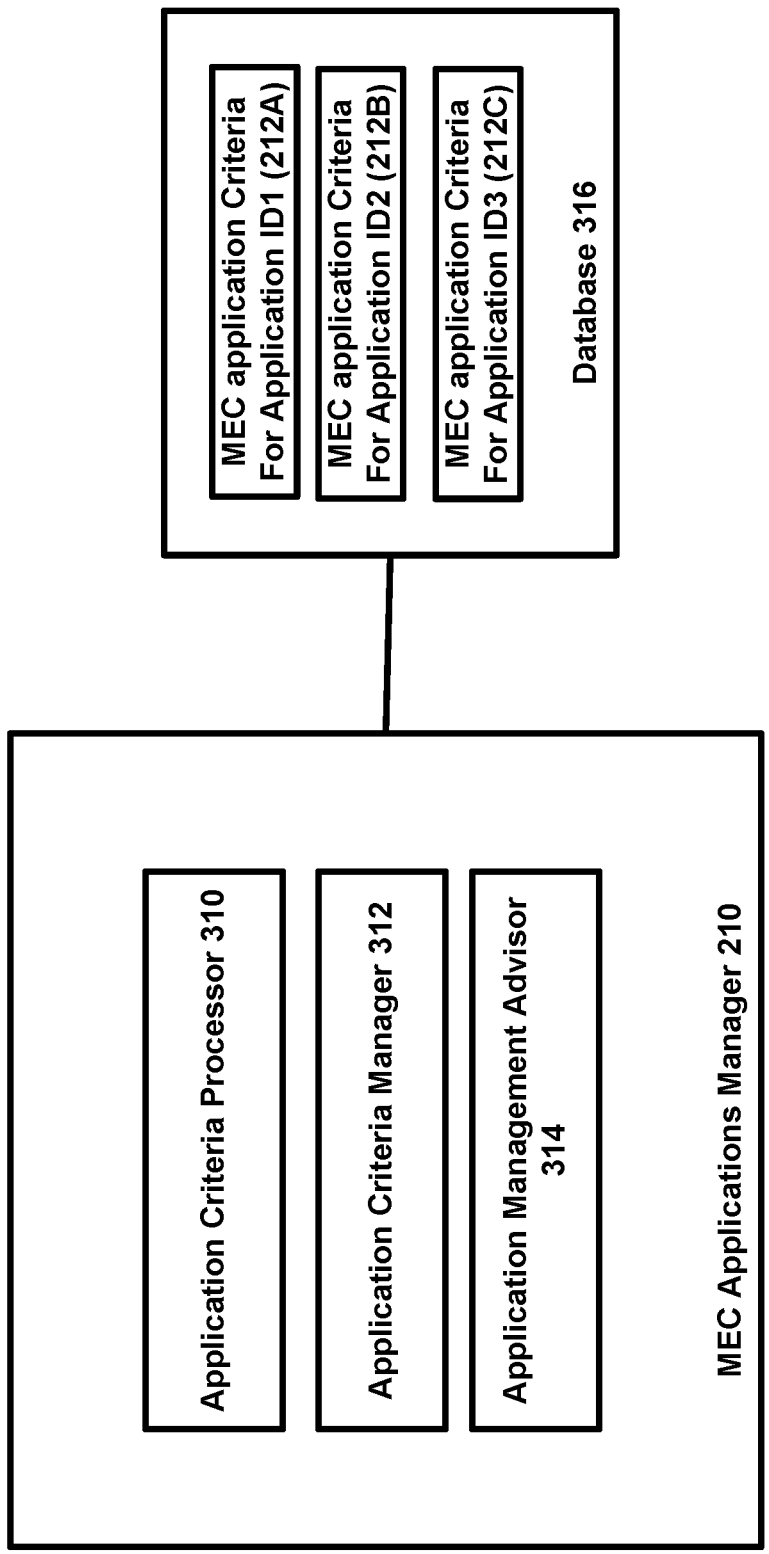
FIG. 3 is a diagram illustrating a mobile edge computing applications manager according to an example embodiment.

FIG. 3 is a diagram illustrating a mobile edge computing applications manager according to an example embodiment. As shown in FIG. 3, MEC applications manager 210 may include, e.g., an application criteria processor 310, an application criteria manager 312, and an application management advisor 314. MEC applications manager 210 may be coupled to a database 316 that may store one or more MEC application criteria. For example, a MEC application criteria may be stored for each of one or more MEC applications. As noted, MEC applications manager 210 may manage or control a MEC application(s) based on a corresponding MEC application criteria, e.g., which may be stored in database 316 or other location.

As shown in FIG. 3, MEC application criteria 212A may be provided to manage or control a MEC application having application ID1; MEC application criteria 212B may be provided to manage or control a MEC application having application ID2; and, MEC application criteria 212C may be provided to manage or control MEC application having application ID3.

Also, database 316 may store other information, including some provisioning information for MEC applications manager 210, such as a threshold(s) for MEC resource idle threshold (e.g., indicating that at least a threshold percentage of MEC resources are idle or available for use) and/or a MEC resource limited threshold (e.g., indicating that less than a threshold amount or percentage of MEC resources are available or idle). When MEC resources cross either of these thresholds, this may cause or trigger MEC applications manager to take steps to better utilize the MEC resources, depending on the situation.

Application Criteria Manager 312 (e.g., Feasibility Check, and Negotiation)

Application criteria manager 312 interacts with an application owner (e.g., external applications controller 218), e.g., through a CFS portal or UE applications to manage the MEC application based on the application owner defined MEC application criteria 212. Once a MEC application criteria is downloaded to MEC server 208 from the external applications controller (or other device or program), the application criteria manager 312 determines or checks the feasibility of application owner defined MEC application criteria 212 based on its own knowledge. If the received MEC application criteria 212 is not feasible, the application criteria manager 312 may trigger (and perform) a MEC application criteria negotiation between the MEC applications manager 210 (e.g., the application criteria manager 312) and the external applications controller 218 or application owner, until a feasible MEC application criteria is determined or agreed upon for the application, e.g., based on the knowledge of both MEC applications manager 210 (or application criteria manager 312 thereof) and the external applications controller 218. The MEC application criteria 212 for an application may be saved or stored in the database 316, e.g., once it is finalized or agreed upon by the parties.

In an example embodiment, a MEC application criteria may include a valid timer parameter, indicating a time period for which this MEC application criteria is valid. Also, for example, if a MEC application criteria does not include a valid timer parameter(s), then the MEC application criteria until a new MEC application criteria is approved as feasible by the application criteria manager 312 of the MEC applications manager 210. If the valid timer parameter is included within a MEC application criteria 212, application criteria manager 312 keeps track of the validation window (or time period during which the MEC application criteria is valid). That is, if the MEC application criteria 212 is expired, the application criteria manager 312 may then remove or delete such MEC application criteria from database 316.

Application Criteria Processor 310 (e.g., Management or Control of Application Based on MEC Application Criteria)

Application criteria processor 310 is responsible for controlling or managing the MEC application 214 based on the corresponding MEC application criteria 212 (e.g., 212A, 212B or 212C) saved in database 316. Some illustrative examples are provided below, and other examples and parameters may be used.

With reference to Table 1 below, MEC application criteria 212 may provide the MEC application management rules for a specific application identified by Application ID/Name. In this illustrative example, MEC application criteria are shown for third-party application #1 ($3^{rd}$ Party APP #1). The MEC application criteria may be (or may include) a list of one or more rules that describe operations to be performed on the application when certain conditions are present or detected. For example, MEC application criteria 212 may include an action criteria that describes a criteria or condition, and a corresponding action to be performed for the application when the action criteria (or condition) is met. Table 1 below illustrates four very simple examples of action criteria and associated actions to be performed when the action criteria is met or satisfied. (Although it should be understood that action criteria of a MEC application criteria may encompass a wide variety of parameters and conditions, and the corresponding actions may include more actions than shown in Table 1). For example, as shown in Table 1, the application is instantiated with a default resource request if a charging rate is less than threshold #1; application scaling up is performed for the application when charging rate is less than threshold #2; application scaling down is performed when the charging rate is greater than threshold #3; and the application is terminated when charging rate is greater than threshold #4.

TABLE 1

| Application ID/Name | Action Criteria | Action |
| --- | --- | --- |
| $3^{rd}$ Party APP #1 | Charging rate lower than threshold #1 | Application instantiation with default resource request |
| $3^{rd}$ Party APP #1 | Charging rate lower than threshold #2 | Application scaling up (increase in MEC resources) |
| $3^{rd}$ Party APP #1 | Charging rate beyond threshold #3 | Application scaling down (decrease in MEC resources) |
| $3^{rd}$ Party APP #1 | Charging rate beyond threshold #4 | Application termination |

Note: In an illustrative example embodiment:
1. The charging rate relationship of threshold #1, #2, #3, #4 shows below: threshold #2<threshold #1<threshold #3<threshold #4
2. Optionally, a Valid Timer parameter may be carried by (or included as part of) MEC application criteria 212 to indicate the expiration of the MEC application criteria. Also, for example, if there is no Valid Timer parameter carried, the MEC application criteria is valid until a new MEC application criteria is received (e.g., and approved or determined as feasible). The MEC application criteria" may be carried in either an existing message (e.g., such as Application context create message, Application context delete message, etc.) from CFS portal/UE application as an optional parameter, or as a standalone new message, e.g., MEC application criteria message.

According to an example embodiment, once the MEC application criteria 212 (e.g., is approved or determined as feasible and) is saved in database 316 (or other location), application criteria processor 310 of MEC applications manager 210 will be triggered to then control or manage the corresponding application(s) based on the received MEC application criteria.

Example Steps of Application Criteria Processor 310:

Example Step 1: Based on the MEC application criteria received, determine if the current network conditions (e.g. tariff or charging rules, or other rules or parameters) meet the criteria. If it is, perform the corresponding application operation(s) (application instantiation, application termination, resource scaling, etc.) accordingly.

Example Step 2: Monitor the network conditions, as they may change, and perform related actions based on the MEC application criteria, e.g., perform new operations on the application when the network conditions change. For example, terminate related application if the charging rate exceeds the acceptable charging rate (e.g., charging rate is greater than threshold #4). Or, instantiate an application once the charging rate meets the criteria (e.g., charging rate is less than threshold #1).

Application Management Advisor 314 (e.g., makes adjustments when resource availability changes, such as initiates or prompts $3^{rd}$ party resource usage for MEC idle resource scenario, or makes adjustments for a MEC limited resource scenario).

Application management advisor 314 may be responsible for guiding or prompting the application owner (or external applications controller 318) by performing appropriate applications management operations. Also, for example, in MEC resource idle scenario, the application management advisor 314 of MEC applications manager on MEC server 208 may initiate the negotiation (e.g., by sending an offered MEC application criteria) with application owner (or external applications controller 218) to trigger application instantiation for revenue generation. In MEC resource limited scenarios, the application management advisor 314 of MEC applications manager 210 on MEC server 208 may identify the applications having a low value and trigger negotiation with third-party application owner (or external applications controller 218) for such low value application(s) to dynamically replace such applications with higher value (e.g., a higher priority application, or an application having a higher charging rate) applications. Thus, once needed, application management advisor 314 may trigger third-party application operation negotiation with application owner or external applications controller 218 to agree on an updated or revised MEC application criteria when a MEC limited resource situation arises, or may reallocate MEC resources to a higher value MEC application.

MEC Application Criteria Negotiation

According to an example embodiment, the MEC applications manager 210 may check or determine the feasibility of application owner defined MEC application criteria 212 based on its own knowledge. If the MEC application criteria is not feasible, a new MEC application criteria negotiation may be triggered between application owner (or external applications controller 218) and MEC applications manager 210 until a revised MEC application criteria is agreed upon between the parties, or until the effort is abandoned.

Upon reception of a message that includes the (e.g., a proposed) MEC application criteria 212 from external applications controller 218 or application owner, e.g., through either CFS portal or UE applications, MEC applications manager 210 may check or determine if the proposed MEC application criteria is feasible, e.g., based on its own intelligence before saving it into database 316 for execution. The MEC applications manager 210 intelligence/knowledge that may be used to determine a feasibility of a MEC application criteria, may include, but is not limited to:

The historic network condition data.

The input from other network elements like 5G core network

A local provisioning of MEC applications manager 210, e.g., saved in database 316, for example the acceptable MEC application criteria range defined by operator (MNO), e.g., for one or more parameters (e.g., charging rates for different times of days, or different days of the week, a range of sizes of resource allocations for different types of applications, or other information, thresholds for MEC idle resource condition or threshold for MEC limited resource condition).

For example, if the charging rate criteria included in the proposed MEC application criteria is very rare, or has not occurred at all in the last 2 months, then the MEC applications manager 210 may deem such proposed MEC application criteria as not feasible. For example, if the proposed MEC application criteria requests instantiation of a video streaming application during a 4 hour period (e.g., 6 pm-10 pm) at a low charging rate, but only a high charging rate has been available during 98% of the specified over the last 2 months. Thus, this requested or proposed MEC application criteria may be rejected by the MEC applications manager 210 based on historical network charging rates for the last 2 months (e.g., the requested MEC resources, and requested times and charging rates for the video streaming application are not viable or feasible, based on historical charging rates at these times, for example).

Figure 4:
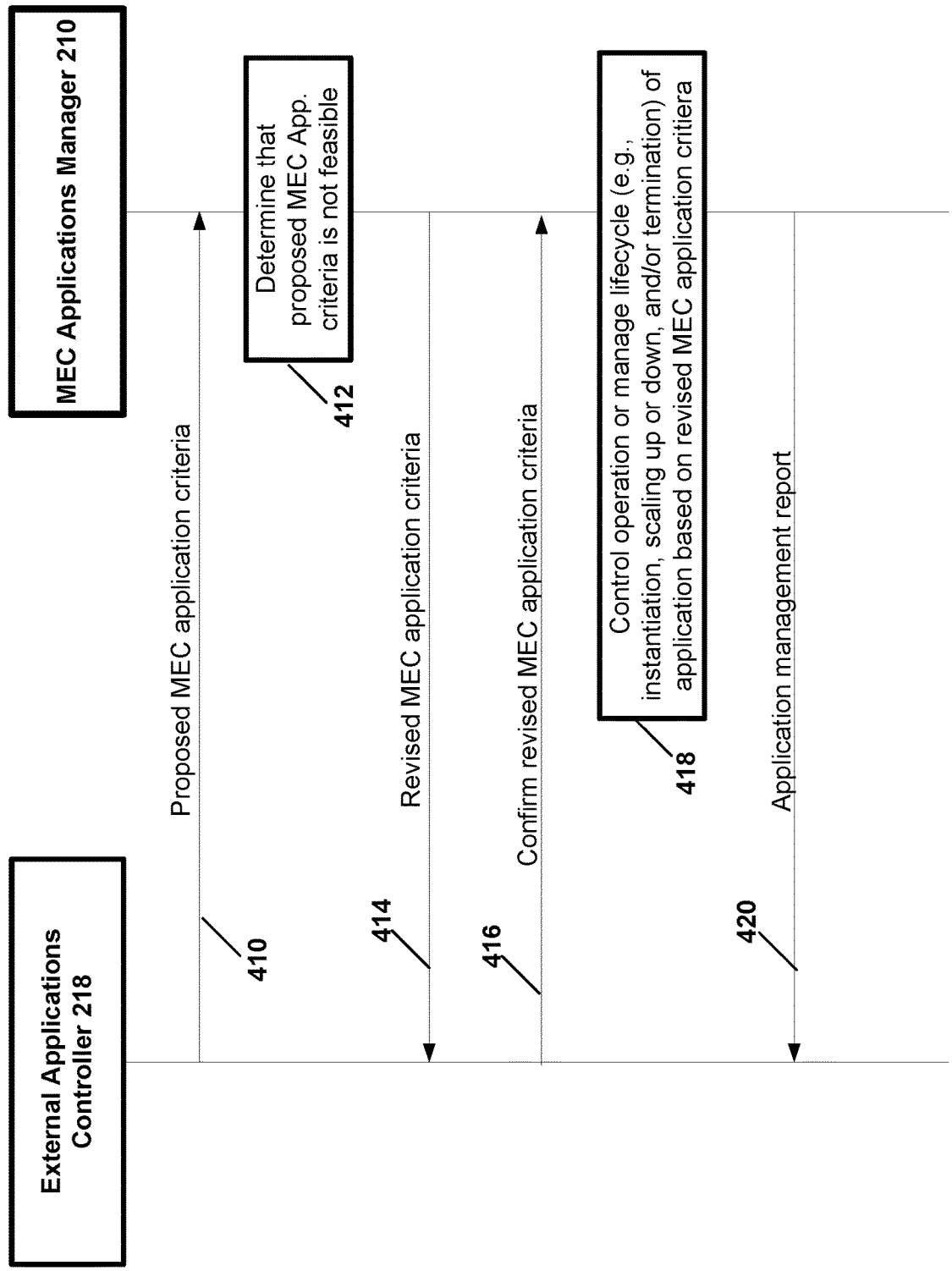
FIG. 4 is a diagram illustrating a MEC application criteria negotiation according to an example embodiment.

FIG. 4 is a diagram illustrating a MEC application criteria negotiation according to an example embodiment. As shown in FIG. 4, an external applications controller 218 (e.g., acting on behalf of an application owner) is in communication with a MEC applications manager 210. At 410, MEC applications manager 210 receives a proposed MEC application criteria from external (e.g., third-party) applications controller 218. The MEC applications manager 210 may then determine the feasibility of the proposed MEC application criteria. If the proposed MEC application criteria is approved (e.g., as feasible) by the MEC applications manager 210, then the process of FIG. 4 may jump down and perform operations 416, 418 and 420 for the proposed MEC application criteria.

At 412, MEC applications manager may determine that the proposed MEC application criteria is not feasible (not viable). At 414, MEC applications manager 210 sends a revised MEC application criteria that includes at least one parameter that may be different from the proposed MEC application criteria that renders the revised MEC application criteria as feasible or viable (from the view or perspective of the MEC applications manager 210 or MNO). For example, for the revised MEC application criteria, a higher charging rate may be indicated for the requested service, or a slightly different time may be indicated (e.g., 3-7 pm at the lower charging rate, rather than the requested 6-10 pm, since a higher charging rate usually applies from 7-10 pm, for example), or a lower amount of MEC resources may be allocated for the application, etc. At 416, if the revised MEC application criteria is acceptable to the external applications controller 218, the external applications controller 218 may confirm or acknowledge the revised MEC application criteria (e.g., indicating that the revised MEC application criteria has been accepted by the external applications controller 218 or application owner).

At 418, the MEC applications manager 210 may then control or manage at least a portion of a lifecycle of the corresponding application based on the revised MEC application criteria (e.g., application instantiation, termination, or scaling of resources up or down for the application, e.g., based on various network conditions or thresholds that may be indicated by the MEC application criteria). Also, if a valid timer parameter (e.g., indicating a time period for which the approved or agreed MEC application criteria is valid) is included in the MEC application criteria, then the MEC applications manager 210 may first confirm that the valid time period for the MEC application criteria has not expired, before managing the application according to the MEC application criteria.

Also, at 420, the MEC applications manager may generate and provide an application management report to the external applications controller 218, e.g., identifying the application (e.g., application identifier), and including information describing the control or management of the application pursuant to the approved or feasible MEC application criteria. For example, the application management report may include, e.g., information indicating the operations that were performed, when or for how long each operation was performed, an amount of MEC server resources that were allocated to the application, various charging rates that were applied for periods of time that the application was running on the MEC server, etc.

A MEC application criteria may include or may be based on a variety of different parameters, such as charging rate, a type or amount of resources, a time period, etc. These are merely some example parameters for a MEC application criteria. For example, by indicating a desired or requested charging rate, this may allow an application owner to maintain a profitable service, for example. However, MEC application criteria may include a wide variety of attributes or parameters, such as, for example, a time application of application running (which may include the start time, running duration, end time), bandwidth, latency, computing resource like CPU, memory and disk space, or special permission request like real-time network and radio information that can be provided by telecom infrastructure (e.g., Radio Network Information Services (RNIS) provided by MEC server, for example,) etc., as some example attributes or parameters. For example, RNIS information may include parameters or information on the UE context and the established E-UTRAN Radio Access Bearer (E-RAB), such as QoS (quality of service), Cell ID (cell identifier) for the E-RAB (radio access bearer), identity of the UE-associated logical signaling connection, etc. The RNIS information may also indicate when a modification to an E-RAB or to a UE context occurs, or when an E-RAB is released. This information is based on 3GPP radio network-layer signaling messages (such as S1 Application Protocol (S1-AP), X2 Application Protocol (X2-AP) and Radio Resource Control (RRC)).

Below are some examples of MEC application criteria, and examples of a feasibility check (feasibility determination) of such MEC application criteria.

Example #1 IoT (Internet of Things) Data Analytics

An IoT company (e.g., for smart city management) may need to collect and analyze data from its sensors deployed in some specific areas across a city everyday. Thus, in this example, an external applications controller 218, acting on behalf of the city, may send a MEC application criteria to MEC applications manager 210, e.g., for the instantiation and operation of its data collection application to be run on a MEC server 208. The MEC application criteria for such IoT data collection application may include (e.g., possibly among other parameters):

| Application ID/Name | Action Criteria | Action |
|---|---|---|
| IoT Data Collection APP ID | Once per day | Application instantiation with specific resource request |

In this case, the application owner doesn't specify a time of application running and there is always (or at least typically) idle time every day on MEC platform or MEC server 208, so this MEC application criteria is feasible and is accepted by the MEC applications manager 210.

Example #2 AR/VR (Augmented Reality/Virtual Reality) Service

AR/VR Service owner, e.g., via its external applications controller 218, may send the below proposed (see 414, FIG. 4) MEC application criteria to request to run or instantiate its AR/VR application during a specific time window (e.g., 10:00-12:00 on May 18) and it also requires a large MEC resource on MEC platform or MEC server 208.

| Application ID/Name | Action Criteria | Action |
|---|---|---|
| AR/VR Application ID | 10:00-12:00 2018/05/18 | Application instantiation with large resource request |

The MEC applications manager 210 may determine or check the feasibility of such a proposed MEC application criteria. In this case, the MEC server (e.g., MEC platform) is unable to provide such a large MEC resource during that time period (e.g., due to other resource commitments by MEC server 208). However, the MEC applications manager 210 may determine an alternative, or slightly different, MEC application criteria that would be feasible. Thus, in this case, the MEC applications manager may send a revised MEC application criteria that may include or indicate one or more feasible possibilities for times and/or resources for the application. Thus, for example, the revised MEC application criteria may indicate the following options or possibilities for this application:

Option #1: Smaller MEC resource during the same time period;

Option #2: Same (large) MEC resource at a different time period(s) when MEC resources are more available, e.g., 8:00-10:00, or 9:00-11:00.

Example #3 Radio Network Information Services (RNIS) Permission is Requested in MEC Application Criteria In this example, an RNIS parameter is added into either Action Criteria or Action field of MEC application criteria. However, MEC application criteria feasibility checking finds that this application does not have permission to request one of these RNIS parameters Therefore, the MEC application manager 210 will reject this MEC application criteria (e.g., because this application does not have permission for to request MEC resources). The MEC application manager 210 may reject this MEC application criteria with a reason indicated in a response, e.g., no permission, or no permission for RNIS parameter.

Likewise, a proposed MEC application criteria may be rejected (e.g., as not feasible) if the requesting party or the application does not have permission for the requested service, e.g., where the requesting party has requested resources, a time of operation for the application, a quality of service, or other parameter for which the application is not authorized by the MNO or the MEC applications manager 210.

Figure 5:
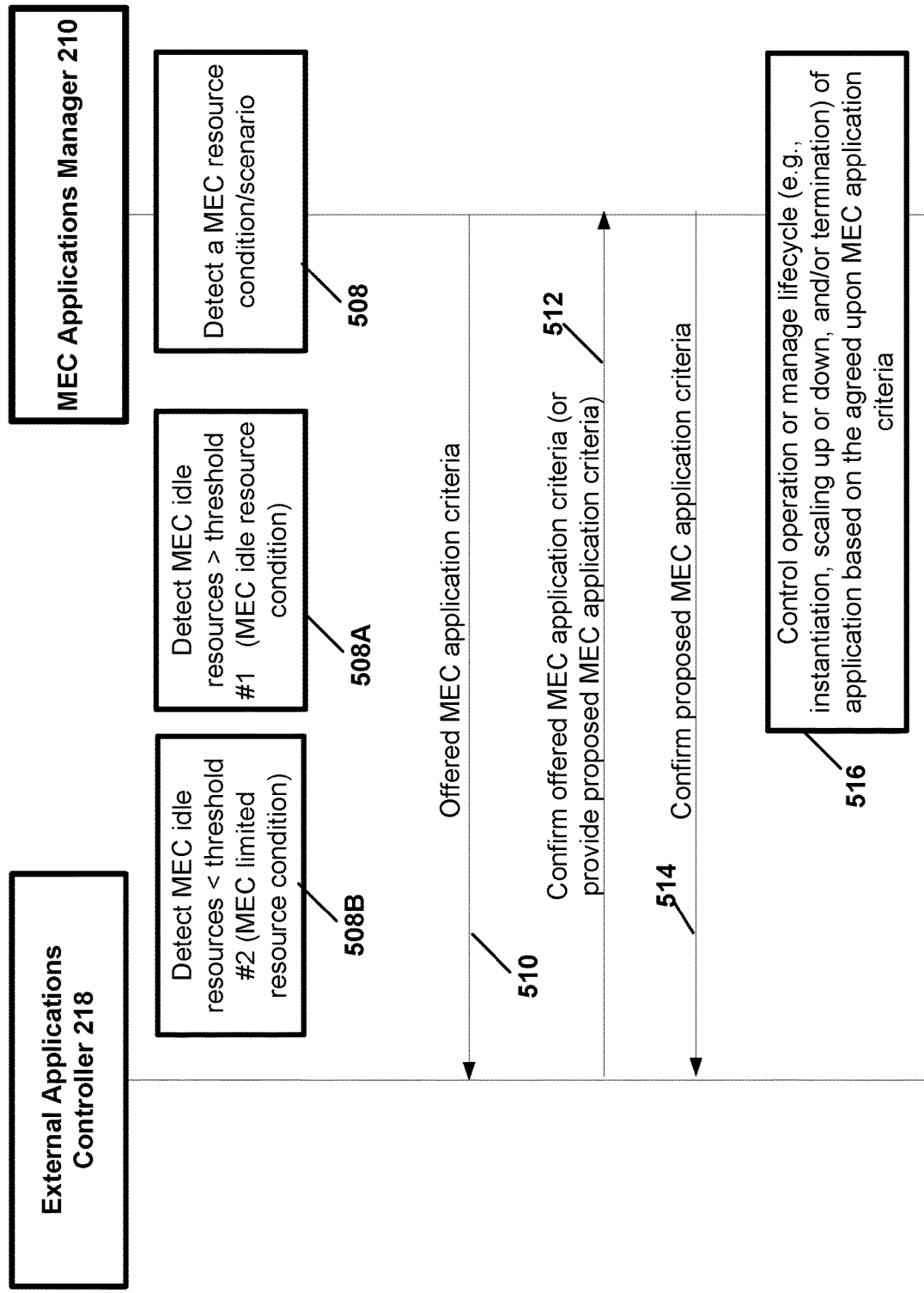
FIG. 5 is a diagram illustrating a MEC application criteria negotiation that is triggered based on a MEC resource condition that is detected by the MEC applications manager according to an example embodiment.

FIG. 5 is a diagram illustrating a MEC application criteria negotiation that is triggered based on a MEC resource condition that is detected by the MEC applications manager according to an example embodiment. At 508, the MEC applications manager 210 may detected a MEC resource condition or scenario. For example, MEC applications manager 210 may detect one of multiple MEC resource conditions that may require or cause the MEC applications manager 210 to make or request some changes to the MEC resources or MEC application criteria. At 508A, the MEC applications manager 210 may detect a MEC idle condition, e.g., in which the amount of idle or available MEC resources are greater than threshold #1. As another example, at 508B, the MEC applications manager 210 may detect a MEC limited resource condition, e.g., in which the amount of idle or available MEC resources is less than threshold #2.

At 510, MEC applications manager 210 may send an offered MEC application criteria, based on the detected MEC resource condition. For example, if a MEC idle resource condition is detected at 508A, then the offered MEC application criteria at 510 may indicate a low MEC resource charging rate to prompt the external applications controller to either approve the offered MEC application, or send a proposed MEC application criteria (not shown in FIG. 5). Thus, the MEC-triggered negotiation may be performed to cause the external applications controller 218 to prompt or cause the external applications controller 218 to request instantiation of an application or scaling up of resources, so as to make use of the idle MEC resources.

In another example embodiment, the MEC applications manager 210 may detect a MEC limited resource condition at 508B. In such a case, at 510, MEC applications manager 210 may send an offered MEC application criteria that may provide, e.g., a higher MEC resource charging rate, an indication of a lower amount of resources to be allocated at the same charging rate, or other adjustment or change to the previously agreed MEC application criteria based on the detected MEC limited resource condition. Thus, the offered MEC application criteria at 510 may be a start to re-negotiate the MEC application criteria, due to now fewer available MEC resources and/or an increase in MEC resource demand, etc. Although not shown in FIG. 5, alternatively, the MEC applications manager 210 may send an application termination indication at 510 to indicate that the application is being terminated, and that resources allocated to the application will be re-allocated to another (e.g., higher value) application. In either case (either in response to an offered MEC application criteria or in response to an indication that the application will be terminated), at 512, the external applications controller 218 may send a proposed MEC application criteria to MEC applications manager 210, or may confirm that the offered MEC application criteria is acceptable. At 514, the MEC applications manager 210 may confirm that the proposed MEC application criteria is acceptable or approved. At 516, the MEC applications manager 210 may then control or manage operation of the application (e.g., application instantiation, termination, scaling up or down of resources) based on the approved or agreed upon MEC application criteria.

Use Case of Dynamic Third-Party MEC Applications Management

Assume sharing video is a video sharing website. It leases MEC server resources to deploy its own MEC video application to provide video service at the network edge (e.g., at the MEC server 208, in proximity to the RAN or a BS) for better user experience and high throughput. To guarantee that this portion of its business will be profitable, sharing video may defines a MEC application criteria (or policy) to define the operation or management for its MEC video application as follows:

Instantiate the MEC Video Application only in the scenario MEC charging rate is lower than threshold #1.

If MEC charging rate is higher than threshold #1, terminate the MEC Video Application on MEC server.

Note: In this example, the threshold #1 here is the baseline to guarantee its MEC video application will be sufficiently profitable, e.g. achieve a 20% profit margin.

To take advantage of MEC low charging rate time window (e.g., during certain hours of the day) to pursue more revenue, it can further define the below policy:

Scale up (or increase MEC resources) for the MEC video application the when the charging rate is lower than threshold #2.

Once the policy (e.g., proposed MEC application criteria) is downloaded to MEC applications manager 210, the MEC applications manager 210 may determine or check the feasibility of the above policy or MEC application criteria based on its own knowledge. If the policy or proposed MEC application criteria is not feasible, MEC application criteria negotiation is triggered between application owner (or external applications controller 218) and MEC applications manager 210 until the parties agree on a MEC application criteria for the application.

For example, to pursue the best (or at least an improved) usage of MEC resources and generate more revenue for operator (MNO), in some scenarios, for example, a MEC idle resource condition, the MEC applications manage 210 will detect this MEC idle resource scenario and will cause or trigger a negotiation with application owner (in this example, it's sharing video website), e.g., via the external applications controller 218, with a low charging rate offer. Due to the low charging rate offer, this may prompt or trigger the application owner or external applications controller 218 to request instantiation or scaling up (increasing) resources for its MEC video application (e.g., via sending a confirmation or sending of a proposed MEC application criteria).

Example Technical Advantages

The various example embodiments of MEC applications management may provide one or more technical advantages, such as, for example:

1) The application owner may define a policy of MEC applications operation such as one or more various conditions under which various operations or application phases will be performed, such as, e.g., instantiation, termination, scaling up of resources, scaling down of resources. This allows an external or third-party application owner (e.g., through its external applications controller), to indicate the various conditions (e.g., what charging rates are acceptable for various operations, times of the day specific days, request a specific amount of resources or request a specific performance), under which it would like its application to be instantiated, scaled up, scaled down, terminated, e.g., without requiring further signaling or messages (or at least decreasing the amount of signaling or messages) between the MEC server (or MEC applications manager 210) and the external applications controller or application owner. Thus, this approach may provide improved performance of the external application on a MEC server (e.g., according to the conditions or instructions provided by the external applications controller).

2) Extra query signaling or messages between the MEC server 208 (e.g., MEC applications manager 210) and the third-party application owner (e.g., external applications controller 218) may be significantly reduced, e.g., because the MEC applications manager 210 may control or manage the operation of the application based on the received and approved MEC application criteria.

3) This enables a MEC application to be run or operated in the scenarios or according to the conditions that are defined or specified by the application owner (or external applications controller that may be acting on behalf of the application owner), e.g., which may provide improved application operation from the view of application owner, e.g., to instantiate and/or scale up its application(s) under its preferred conditions, e.g., low expense scenarios, at certain times when demand for the application exceeds a threshold, under certain network conditions, and similarly, under what conditions the application owner or external applications controller 218 would like to request the application be scaled down or terminated (e.g., during certain time periods, or during high charging rates).

4) If the proposed MEC application criteria from the applications owner or external applications controller is not feasible (e.g., as one example, this may occur when the requested charging rates do not occur during the indicated time periods for instantiating the application), then this may cause or trigger a negotiation to determine or agree on a revised MEC application criteria to be used to mange operation of the application. For example, as part of the negotiation, the MEC applications manager 210 may send a revised MEC application criteria that is feasible or possible, which may be approved by the external applications controller 218. If the revised MEC application criteria is not acceptable to the external applications controller 218, then the external applications controller may send a second proposed MEC application criteria to the MEC applications manager 210 or MEC server 208, and this negotiation may continue until a MEC application criteria has been agreed upon by both parties (or until the negotiation is abandoned by one or both parties).

5) Techniques are also provided to allow the MEC applications manager to respond to specific conditions or changes in conditions, in order to provide an improved utilization of MEC resources. The example conditions may include, for example: 1) an idle MEC resource scenario where there are idle or available MEC resource; in this case, the MEC applications manager 210 may send a suggested or offered MEC application criteria to prompt the external applications controller to provide a confirmation or agree with the offered MEC application criteria or to send back a proposed MEC application criteria; and, 2) a limited (or scarce) MEC resource scenario in which there are few if any MEC resources, and the MEC application may reallocate some (e.g., previously allocated) MEC resources to a higher value application and/or may renegotiate a MEC application criteria for a low value application to obtain greater value (e.g., higher charging rate) for some MEC resources. Thus, in a limited MEC resource scenario, an (e.g., low value) application may be terminated in favor of a higher value application. Or, alternatively, rather than simply terminating the low value application in the case of limited or scarce MEC resources, a renegotiation may be performed between the MEC applications manager 210 and the external applications controller 218, in attempt to agree on a revised MEC application criteria (e.g., which may include a higher charging rate to reflect the current higher demand for MEC resources. This dynamic approach to MEC applications management may allow the system to adapt to different or changing conditions, and may, for example, provide techniques to maximize (or at least improve) MEC resource usage (e.g., during an idle MEC resource situation), while adapting to obtain more value (e.g., by running higher priority applications, or running applications that are approved for a higher charging rate), e.g., during a limited MEC resource situation.

Some example embodiments are now described.

Figure 6:
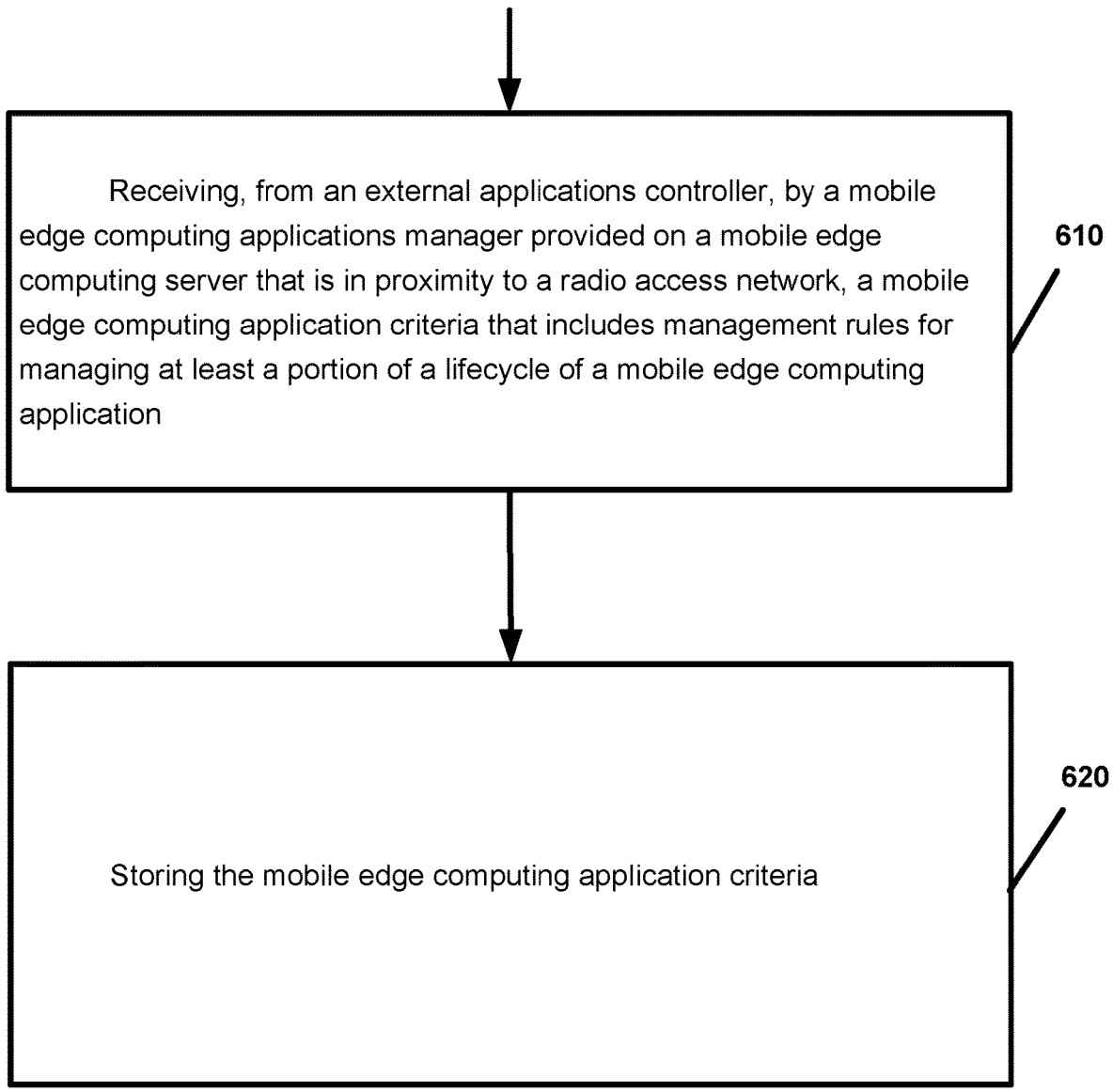
FIG. 6 is a flow chart illustrating operation of a mobile edge computing applications manager according to an example embodiment.

Example 1. FIG. 6 is a flow chart illustrating operation of a mobile edge computing applications manager according to an example embodiment. Operation 610 includes receiving, from an external applications controller, by a mobile edge computing applications manager provided on a mobile edge computing server that is in proximity to a radio access network, a mobile edge computing application criteria that includes management rules for managing at least a portion of a lifecycle of a mobile edge computing application. And, operation 620 includes storing the mobile edge computing application criteria.

Example 2. According to an example embodiment of the method of Example 1, and further comprising: managing at least a portion of a lifecycle of the mobile edge computing application based on the mobile edge computing application criteria.

Example 3. According to an example embodiment of the method of any of Examples 1-2, and further comprising: determining, by the mobile edge computing applications manager, a feasibility of the mobile edge computing application criteria; and managing, if the mobile edge computing application criteria is feasible, at least a portion of a lifecycle of the mobile edge computing application based on the mobile edge computing application criteria.

Example 4. According to an example embodiment of the method of any of Examples 3, wherein the received mobile edge computing application criteria comprises a proposed mobile edge computing application criteria, wherein the managing comprises: determining, by the mobile edge computing applications manager, that the proposed mobile edge computing application criteria is not feasible; negotiating, by the mobile edge computing applications manager with the external applications controller, to agree on a revised mobile edge computing application criteria that is feasible; storing the revised mobile edge computing application criteria in a database for use in managing the mobile edge computing application; and managing, by the mobile edge computing applications manager, at least a portion of the lifecycle of the mobile edge computing application based on the revised mobile edge computing application criteria.

Example 5. According to an example embodiment of the method of Example 4, wherein the negotiating comprises sending, by the mobile edge computing applications manager to the external applications controller, a revised mobile edge computing application criteria that includes at least one mobile edge computing application criteria parameter that is different than the proposed mobile edge computing application criteria and which renders the revised mobile edge computing application criteria as feasible; and receiving, by the mobile edge computing applications manager from the external applications controller, a confirmation of the revised mobile edge computing application criteria.

Example 6. According to an example embodiment of the method of any of Examples 1-5, wherein the receiving the mobile edge computing application criteria is performed in response to sending, by the mobile edge computing applications manager to the external applications controller, an offered mobile edge computing application criteria.

Example 7. According to an example embodiment of the method of any of Examples 1-6, wherein the determining, by the mobile edge computing applications manager, a feasibility of the mobile edge computing application criteria comprises: comparing one or more parameters of the mobile edge computing application criteria to one or more constraints associated with the mobile edge computing applications management; determining a feasibility of the mobile edge computing application criteria, as one of the following: determining, based on the comparing, that the mobile edge computing application criteria is not feasible based on a determination that the one or more parameters of the mobile edge computing application criteria violate the one or more constraints associated with the mobile edge computing applications management; and determining, based on the comparing, that the mobile edge computing application criteria is feasible based on a determination that the one or more parameters of the mobile edge computing application criteria do not violate the one or more constraints associated with the mobile edge computing applications management.

Example 8. According to an example embodiment of the method of any of Examples 2-7 wherein managing at least a portion of a lifecycle of a mobile edge computing application comprises performing, and/or determining whether to perform, one or more of the following based on a comparison of the mobile edge computing application criteria or the revised mobile edge computing application criteria to one or more conditions associated with the lifecycle management of the mobile edge computing application: instantiating the mobile edge computing application; terminating the mobile edge computing application; scaling up resources allocated to the mobile edge computing application; and scaling down resources allocated to the mobile edge computing application.

Example 9. According to an example embodiment of the method of any of Examples 1-8 wherein the mobile edge computing application criteria or the revised mobile edge computing application criteria comprises at least: an application identifier that identifies the mobile edge computing application; and a value for one or more parameters for managing at least a portion of a lifecycle of the mobile edge computing application, including an action criteria and an associated action to be performed for the mobile edge computing application if the action criteria is met.

Example 10. According to an example embodiment of the method of any of Examples 1-9 wherein mobile edge computing application criteria or the revised mobile edge computing application criteria comprises at least one of the following: a first threshold for determining one or more conditions to instantiate the mobile edge computing application; a second threshold for determining one or more conditions to terminate the mobile edge computing application; a third threshold for determining one or more conditions to scale up resources allocated to the mobile edge computing application; and a fourth threshold for determining one or more conditions to scale down resources allocated to the mobile edge computing application.

Example 11. According to an example embodiment of the method of any of Examples 1-10 wherein the mobile edge computing application criteria or the revised mobile edge computing application criteria comprises at least one of the following: a first charging rate threshold for determining a range of charging rates, for which the mobile edge computing applications manager is being requested to instantiate the mobile edge computing application; a second charging rate threshold for determining a range of charging rates, for which the mobile edge computing applications manager is being requested to scale up resources for the mobile edge computing application; a third charging rate threshold for determining a range of charging rates, for which the mobile edge computing applications manager is being requested to scale down resources for the mobile edge computing application; a fourth charging rate threshold for determining a range of charging rates, for which the mobile edge computing applications manager is being requested to terminate the mobile edge computing application.

Example 12. According to an example embodiment of the method of any of Examples 1-11 wherein the mobile edge computing application criteria or the revised mobile edge computing application criteria comprises a value for one or more of the following parameters for managing at least a portion of a lifecycle of the mobile edge computing application: a valid timer parameter that identifies a time period for which the mobile edge computing application criteria is valid; a charging rate threshold for determining whether to perform one or more actions or cycles of the lifecycle management of the mobile edge computing application; a memory resource, a processing resource, or a bandwidth resource, requested for the mobile edge computing application; an amount of bandwidth resources requested for the mobile edge computing application; a requested performance for the mobile edge computing application related to at least one of a latency, a minimum bandwidth or data throughput, or a quality of service; and a radio network information service (RNIS) information related to a user device or a radio access bearer for the user device.

Example 13. According to an example embodiment of the method of any of Examples 1-12, wherein the mobile edge computing application criteria or the revised mobile edge computing application criteria specifies a network condition and an associated action to be performed for the mobile edge computing application when the network condition is met, and wherein the managing at least a portion of a lifecycle of the mobile edge computing application comprises: determining that the network condition is met; performing the associated action for the mobile edge computing application based on the network condition being met, wherein the associated action includes one of: instantiate the mobile edge computing application, terminate the mobile edge computing application, scale up resources for the mobile edge computing application, and scale down resources for the mobile edge computing application.

Example 14. According to an example embodiment of the method of any of Examples 1-13 and further comprising: detecting a change in network conditions related to at least one of a change in an availability of mobile edge computing server resources or a change in demand for mobile edge computing server resources; and sending, by the mobile edge computing applications manager to the external applications controller, a revised mobile edge computing application criteria based on the detected change in network conditions.

Example 15. According to an example embodiment of the method of any of Examples 1-14 wherein the detecting a change in network conditions comprises at least one of: detecting an increase or decrease in mobile edge computing server resources; detecting a change in a charging rate(s) to be charged for the mobile edge computing application; and detecting a change in demand for mobile edge computing server resources based on resource requests for other mobile edge computing applications.

Example 16. An apparatus comprising means for performing a method of any of Examples 1-15.

Example 17. A non-transitory computer-readable storage medium comprising instructions stored thereon that, when executed by at least one processor, are configured to cause a computing system to perform a method of any of Examples 1-15.

Example 18. An apparatus comprising at least one processor and at least one memory including computer instructions, when executed by the at least one processor, cause the apparatus to perform a method of any of Examples 1-15.

Example 19. An apparatus comprising at least one processor and at least one memory including computer instructions, when executed by the at least one processor, cause the apparatus to: receive, from an external applications controller, by a mobile edge computing applications manager provided on a mobile edge computing server that is in proximity to a radio access network, a mobile edge computing application criteria that includes management rules for managing at least a portion of a lifecycle of a mobile edge computing application; and store the mobile edge computing application criteria.

Example 20. The apparatus of Example 19 and further causing the apparatus to: manage at least a portion of a lifecycle of the mobile edge computing application based on the mobile edge computing application criteria.

Example 21. The apparatus of Example 19 and further causing the apparatus to: determine, by the mobile edge computing applications manager, a feasibility of the mobile edge computing application criteria; and manage, if the mobile edge computing application criteria is feasible, at least a portion of a lifecycle of the mobile edge computing application based on the mobile edge computing application criteria.

Example 22. The apparatus of any of Examples 19-21, wherein the received mobile edge computing application criteria comprises a proposed mobile edge computing application criteria, and wherein causing the apparatus to manage comprises causing the apparatus to: determine, by the mobile edge computing applications manager, that the proposed mobile edge computing application criteria is not feasible; negotiate, by the mobile edge computing applications manager with the external applications controller, to agree on a revised mobile edge computing application criteria that is feasible; store the revised mobile edge computing application criteria in a database for use in managing the mobile edge computing application; and manage, by the mobile edge computing applications manager, at least a portion of the lifecycle of the mobile edge computing application based on the revised mobile edge computing application criteria.

Example 23. The apparatus of Example 22, wherein causing the apparatus to negotiate comprises causing the apparatus to: send, by the mobile edge computing applications manager to the external applications controller, a revised mobile edge computing application criteria that includes at least one mobile edge computing application criteria parameter that is different than the proposed mobile edge computing application criteria and which renders the revised mobile edge computing application criteria as feasible; and receive, by the mobile edge computing applications manager from the external applications controller, a confirmation of the revised mobile edge computing application criteria.

Example 24. The apparatus of any of Examples 19-23 wherein causing the apparatus to receive the mobile edge computing application criteria is performed in response to sending, by the mobile edge computing applications manager to the external applications controller, an offered mobile edge computing application criteria.

Example 25. The apparatus of any of Examples 19-24 wherein causing the apparatus to determine, by the mobile edge computing applications manager, a feasibility of the mobile edge computing application criteria comprises causing the apparatus to: compare one or more parameters of the mobile edge computing application criteria to one or more constraints associated with the mobile edge computing applications management; determine a feasibility of the mobile edge computing application criteria, as one of the following: determine, based on the comparing, that the mobile edge computing application criteria is not feasible based on a determination that the one or more parameters of the mobile edge computing application criteria violate the one or more constraints associated with the mobile edge computing applications management; and determine, based on the comparing, that the mobile edge computing application criteria is feasible based on a determination that the one or more parameters of the mobile edge computing application criteria do not violate the one or more constraints associated with the mobile edge computing applications management.

Example 26. The apparatus of any of Examples 20-25 wherein causing the apparatus to manage at least a portion of a lifecycle of a mobile edge computing application comprises causing the apparatus to perform, and/or determine whether to perform, one or more of the following based on a comparison of the mobile edge computing application criteria or the revised mobile edge computing application criteria to one or more conditions associated with the lifecycle management of the mobile edge computing application: instantiate the mobile edge computing application; terminate the mobile edge computing application; scale up resources allocated to the mobile edge computing application; and scale down resources allocated to the mobile edge computing application.

Example 27. The apparatus of any of Examples 19-26 wherein the mobile edge computing application criteria or the revised mobile edge computing application criteria comprises at least: an application identifier that identifies the mobile edge computing application; and a value for one or more parameters for managing at least a portion of a lifecycle of the mobile edge computing application, including an action criteria and an associated action to be performed for the mobile edge computing application if the action criteria is met.

Example 28. The apparatus of any of Examples 19-27 wherein mobile edge computing application criteria or the revised mobile edge computing application criteria comprises at least one of the following: a first threshold for determining one or more conditions to instantiate the mobile edge computing application; a second threshold for determining one or more conditions to terminate the mobile edge computing application; a third threshold for determining one or more conditions to scale up resources allocated to the mobile edge computing application; and a fourth threshold for determining one or more conditions to scale down resources allocated to the mobile edge computing application.

Example 29. The apparatus of any of Examples 19-28 wherein the mobile edge computing application criteria or the revised mobile edge computing application criteria comprises at least one of the following: a first charging rate threshold for determining a range of charging rates, for which the mobile edge computing applications manager is being requested to instantiate the mobile edge computing application; a second charging rate threshold for determining a range of charging rates, for which the mobile edge computing applications manager is being requested to scale up resources for the mobile edge computing application; a third charging rate threshold for determining a range of charging rates, for which the mobile edge computing applications manager is being requested to scale down resources for the mobile edge computing application; and a fourth charging rate threshold for determining a range of charging rates, for which the mobile edge computing applications manager is being requested to terminate the mobile edge computing application.

Example 30. The apparatus of any of Examples 19-29 wherein the mobile edge computing application criteria or the revised mobile edge computing application criteria comprises a value for one or more of the following parameters for managing at least a portion of a lifecycle of the mobile edge computing application: a valid timer parameter that identifies a time period for which the mobile edge computing application criteria is valid; a charging rate threshold for determining whether to perform one or more actions or cycles of the lifecycle management of the mobile edge computing application; a memory resource, a processing resource, or a bandwidth resource, requested for the mobile edge computing application; an amount of bandwidth resources requested for the mobile edge computing application; a requested performance for the mobile edge computing application related to at least one of a latency, a minimum bandwidth or data throughput, or a quality of service; and a radio network information service (RNIS) information related to a user device or a radio access bearer for the user device.

Example 31. The apparatus of any of Examples 19-30 wherein the mobile edge computing application criteria or the revised mobile edge computing application criteria specifies a network condition and an associated action to be performed for the mobile edge computing application when the network condition is met, and wherein causing the apparatus to manage at least a portion of a lifecycle of the mobile edge computing application comprises causing the apparatus to: determine that the network condition is met; perform the associated action for the mobile edge computing application based on the network condition being met, wherein the associated action includes one of: instantiate the mobile edge computing application, terminate the mobile edge computing application, scale up resources for the mobile edge computing application, and scale down resources for the mobile edge computing application.

Example 32. The apparatus of any of Examples 19-31 and further causing the apparatus to: detect a change in network conditions related to at least one of a change in an availability of mobile edge computing server resources or a change in demand for mobile edge computing server resources; and send, by the mobile edge computing applications manager to the external applications controller, a revised mobile edge computing application criteria based on the detected change in network conditions.

Example 33. The apparatus of Example 32 wherein causing the apparatus to detect a change in network conditions comprises at least one of: detect an increase or decrease in mobile edge computing server resources; detect a change in a charging rate(s) to be charged for the mobile edge computing application; and detect a change in demand for mobile edge computing server resources based on resource requests for other mobile edge computing applications.

Figure 7:
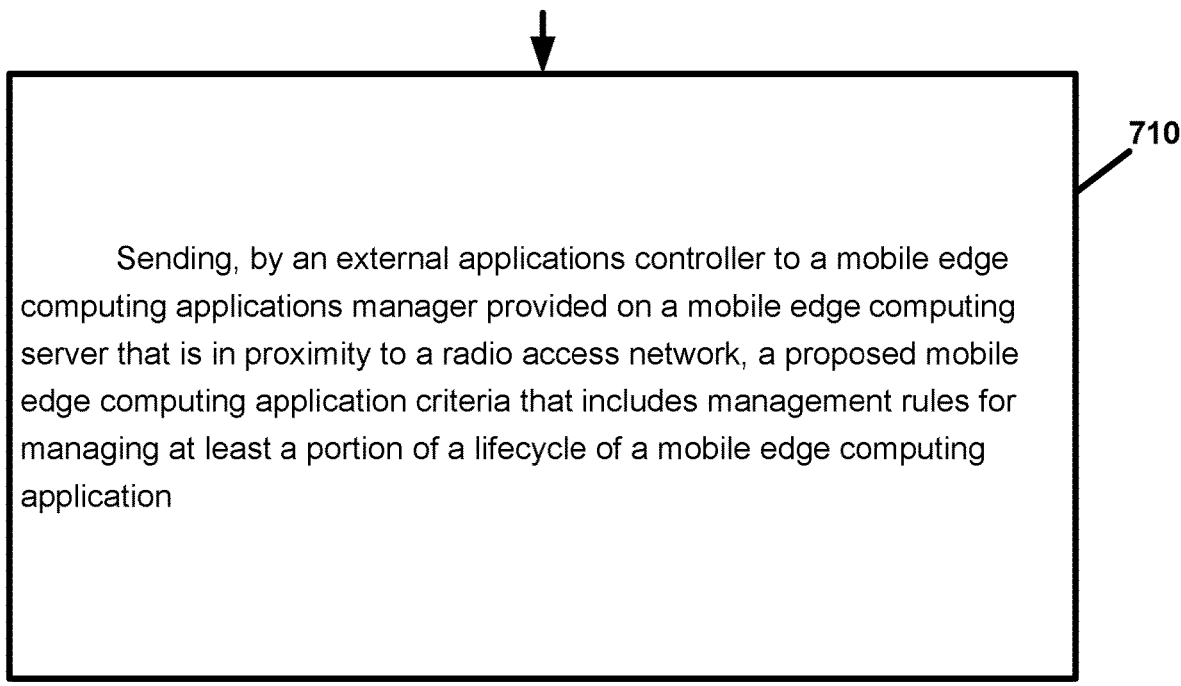
FIG. 7 is a flow chart illustrating operation of an external applications controller according to an example embodiment.

Example 34. FIG. 7 is a flow chart illustrating operation of an external applications controller according to an example embodiment. Operation 710 includes sending, by an external applications controller to a mobile edge computing applications manager provided on a mobile edge computing server that is in proximity to a radio access network, a proposed mobile edge computing application criteria that includes management rules for managing at least a portion of a lifecycle of a mobile edge computing application.

Example 35. The method of Example 34 and further comprising: receiving, by the external applications controller from the mobile edge computing applications manager, a revised mobile edge computing application criteria that includes at least one mobile edge computing application criteria parameter that is different than the proposed mobile edge computing application criteria and which renders the revised mobile edge computing application criteria as feasible with respect to the mobile edge computing applications manager; and sending, by the external applications controller from the mobile edge computing applications manager, a confirmation of the revised mobile edge computing application criteria.

Example 36. The method of any of Examples 34-35 wherein the proposed or revised mobile edge computing application criteria comprises at least: an application identifier that identifies the mobile edge computing application; and a value for one or more parameters for managing at least a portion of a lifecycle of the mobile edge computing application, including an action criteria and an associated action to be performed for the mobile edge computing application if the action criteria is met.

Example 37. The method of any of Examples 34-36 wherein the mobile edge computing application criteria comprises at least one of the following: a first threshold for determining one or more conditions to instantiate the mobile edge computing application; a second threshold for determining one or more conditions to terminate the mobile edge computing application; a third threshold for determining one or more conditions to scale up resources allocated to the mobile edge computing application; and a fourth threshold for determining one or more conditions to scale down resources allocated to the mobile edge computing application.

Example 38. The method of any of Examples 34-37 wherein the proposed mobile edge computing application criteria or the revised mobile edge computing application criteria comprises at least one of the following: a first charging rate threshold for determining a range of charging rates, for which the mobile edge computing applications manager is being requested to instantiate the mobile edge computing application; a second charging rate threshold for determining a range of charging rates, for which the mobile edge computing applications manager is being requested to scale up resources for the mobile edge computing application; a third charging rate threshold for determining a range of charging rates, for which the mobile edge computing applications manager is being requested to scale down resources for the mobile edge computing application; a fourth charging rate threshold for determining a range of charging rates, for which the mobile edge computing applications manager is being requested to terminate the mobile edge computing application.

Example 39. The method of any of Examples 34-38 wherein the proposed mobile edge computing application criteria or the revised mobile edge computing application criteria comprises a value for one or more of the following parameters for managing at least a portion of a lifecycle of the mobile edge computing application: a valid timer parameter that identifies a time period for which the mobile edge computing application criteria is valid; a charging rate threshold for determining whether to perform one or more actions or cycles of the lifecycle management of the mobile edge computing application; a memory resource, a processing resource, or a bandwidth resource, requested for the mobile edge computing application; an amount of bandwidth resources requested for the mobile edge computing application; a requested performance for the mobile edge computing application related to at least one of a latency, a minimum bandwidth or data throughput, or a quality of service; and a radio network information service (RNIS) information related to a user device or a radio access bearer for the user device.

Example 40. An apparatus comprising means for performing a method of any of Examples 34-39.

Example 41. A non-transitory computer-readable storage medium comprising instructions stored thereon that, when executed by at least one processor, are configured to cause a computing system to perform a method of any of Examples 34-39.

Example 42. An apparatus comprising at least one processor and at least one memory including computer instructions, when executed by the at least one processor, cause the apparatus to perform a method of any of Examples 34-39.

Example 43. An apparatus comprising at least one processor and at least one memory including computer instructions, when executed by the at least one processor, cause the apparatus to: send, by an external applications controller to a mobile edge computing applications manager provided on a mobile edge computing server that is in proximity to a radio access network, a proposed mobile edge computing application criteria that includes management rules for managing at least a portion of a lifecycle of a mobile edge computing application.

Example 44. The apparatus of Example 43 and further causing the apparatus to: receive, by the external applications controller from the mobile edge computing applications manager, a revised mobile edge computing application criteria that includes at least one mobile edge computing application criteria parameter that is different than the proposed mobile edge computing application criteria and which renders the revised mobile edge computing application criteria as feasible with respect to the mobile edge computing applications manager; and send, by the external applications controller from the mobile edge computing applications manager, a confirmation of the revised mobile edge computing application criteria.

Example 45. The apparatus of any of Examples 43-44 wherein the proposed or revised mobile edge computing application criteria comprises at least: an application identifier that identifies the mobile edge computing application; and a value for one or more parameters for managing at least a portion of a lifecycle of the mobile edge computing application, including an action criteria and an associated action to be performed for the mobile edge computing application if the action criteria is met.

Example 46. The apparatus of any of Examples 43-45 wherein the mobile edge computing application criteria comprises at least one of the following: a first threshold for determining one or more conditions to instantiate the mobile edge computing application; a second threshold for determining one or more conditions to terminate the mobile edge computing application; a third threshold for determining one or more conditions to scale up resources allocated to the mobile edge computing application; and a fourth threshold for determining one or more conditions to scale down resources allocated to the mobile edge computing application.

Example 47. The apparatus of any of Examples 43-46 wherein the mobile edge computing application criteria comprises at least one of the following: a first charging rate threshold for determining a range of charging rates, for which the mobile edge computing applications manager is being requested to instantiate the mobile edge computing application; a second charging rate threshold for determining a range of charging rates, for which the mobile edge computing applications manager is being requested to scale up resources for the mobile edge computing application; a third charging rate threshold for determining a range of charging rates, for which the mobile edge computing applications manager is being requested to scale down resources for the mobile edge computing application; a fourth charging rate threshold for determining a range of charging rates, for which the mobile edge computing applications manager is being requested to terminate the mobile edge computing application.

Example 48. The apparatus of any of Examples 43-47 wherein the mobile edge computing application criteria comprises a value for one or more of the following parameters for managing at least a portion of a lifecycle of the mobile edge computing application: a valid timer parameter that identifies a time period for which the mobile edge computing application criteria is valid; a charging rate threshold for determining whether to perform one or more actions or cycles of the lifecycle management of the mobile edge computing application; a memory resource, a processing resource, or a bandwidth resource, requested for the mobile edge computing application; an amount of bandwidth resources requested for the mobile edge computing application; a requested performance for the mobile edge computing application related to at least one of a latency, a minimum bandwidth or data throughput, or a quality of service; and a radio network information service (RNIS) information related to a user device or a radio access bearer for the user device.

Example 49. An apparatus comprising at least one processor and at least one memory including computer instructions, when executed by the at least one processor, cause the apparatus to: receive, from an external applications controller, by a mobile edge computing applications manager provided on a mobile edge computing server that is in proximity to a radio access network, a proposed mobile edge computing application criteria that includes management rules for managing at least a portion of a lifecycle of a mobile edge computing application; determine, by the mobile edge computing applications manager, that the proposed mobile edge computing application criteria is feasible; send, by the mobile edge computing applications manager to the external applications controller, a confirmation indicating that the proposed mobile edge computing application criteria is feasible; and manage, by the mobile edge computing applications manager, at least a portion of a lifecycle of the mobile edge computing application based on the mobile edge computing application criteria.

Example 50. The apparatus of Example 49 and further causing the apparatus to: send, by the external applications controller to the mobile edge computing applications manager, the proposed mobile edge computing application criteria that includes management rules for managing at least a portion of a lifecycle of the mobile edge computing application; and receive, by the external applications controller, the confirmation of the proposed mobile edge computing application criteria.

Figure 8:
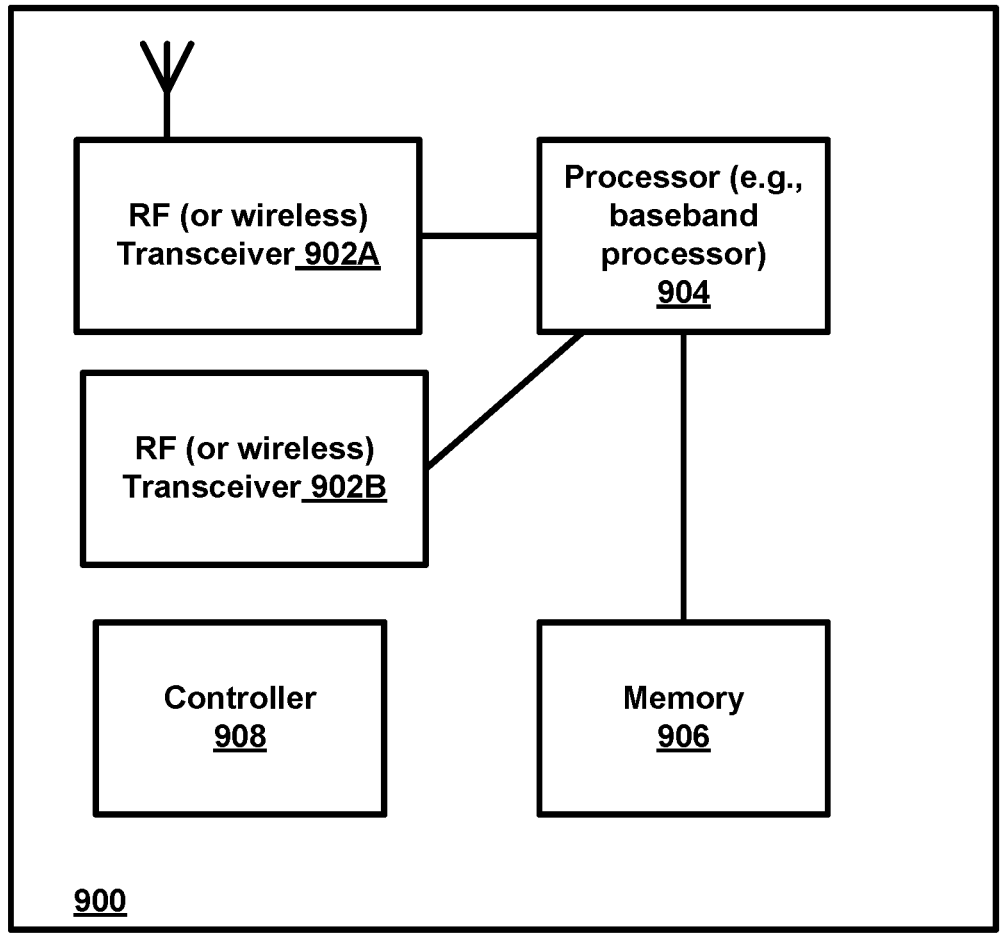
FIG. 8 is a block diagram of a node or wireless station (e.g., base station/access point or mobile station/user device/UE) according to an example embodiment.

FIG. 8 is a block diagram of a wireless station (e.g., AP or user device) 900 according to an example embodiment. The wireless station 900 may include, for example, one or two RF (radio frequency) or wireless transceivers 902A, 902B, where each wireless transceiver includes a transmitter to transmit signals and a receiver to receive signals. The wireless station also includes a processor or control unit/entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 8, a controller (or processor) 908 may execute software and instructions, and may provide overall control for the station 900, and may provide control for other systems not shown in FIG. 8, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example embodiment, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising at least one processor and at least one memory including computer instructions, when executed by the at least one processor, cause the apparatus to:
receive, from an external applications controller, by a mobile edge computing applications manager provided on a mobile edge computing server that is in proximity to a radio access network, a mobile edge computing application criteria that includes management rules for managing at least a portion of a lifecycle of a mobile edge computing application;
determining a feasibility of the mobile edge application criteria;
in response to determining the mobile edge application criteria are not feasible,
generate a revised mobile edge application criteria,
send the revised mobile edge application criteria to the external application controller,
receive a confirmation of the revised mobile edge application criteria, and
store the revised mobile edge computing application criteria;
in response to determining the mobile edge application criteria are feasible,
store the mobile edge computing application criteria; and
communicate an application management report to the external applications controller, wherein the mobile edge computing application criteria or the revised mobile edge computing application criteria comprises at least one of the following:
a first charging rate threshold for determining a range of charging rates, for which the mobile edge computing applications manager is being requested to instantiate the mobile edge computing application;
a second charging rate threshold for determining a range of charging rates, for which the mobile edge computing applications manager is being requested to scale up resources for the mobile edge computing application;
a third charging rate threshold for determining a range of charging rates, for which the mobile edge computing applications manager is being requested to scale down resources for the mobile edge computing application; and
a fourth charging rate threshold for determining a range of charging rates, for which the mobile edge computing applications manager is being requested to terminate the mobile edge computing application.

2. The apparatus of claim 1 and further causing the apparatus to:
manage, if the mobile edge computing application criteria is feasible, at least a portion of a lifecycle of the mobile edge computing application based on the mobile edge computing application criteria.

3. The apparatus of claim 1, wherein the received mobile edge computing application criteria comprises a proposed mobile edge computing application criteria, and wherein causing the apparatus to manage comprises causing the apparatus to:
determine, by the mobile edge computing applications manager, that the proposed mobile edge computing application criteria is not feasible;
negotiate, by the mobile edge computing applications manager with the external applications controller, to agree on a revised mobile edge computing application criteria that is feasible; and
store the revised mobile edge computing application criteria in a database for use in managing the mobile edge computing application; and
managing, by the mobile edge computing applications manager, at least a portion of the lifecycle of the mobile edge computing application based on the revised mobile edge computing application criteria.

4. The apparatus of claim 3, wherein causing the apparatus to negotiate comprises causing the apparatus to:
send, by the mobile edge computing applications manager to the external applications controller, the revised mobile edge computing application criteria that includes at least one mobile edge computing application criteria parameter that is different than the proposed mobile edge computing application criteria and which renders the revised mobile edge computing application criteria as feasible.

5. The apparatus of claim 1, wherein causing the apparatus to receive the mobile edge computing application criteria is performed in response to sending, by the mobile edge computing applications manager to the external applications controller, an offered mobile edge computing application criteria.

6. The apparatus of claim 2 wherein causing the apparatus to determine, by the mobile edge computing applications manager, a feasibility of the mobile edge computing application criteria comprises causing the apparatus to:
compare one or more parameters of the mobile edge computing application criteria to one or more constraints associated with the mobile edge computing applications management;
determine a feasibility of the mobile edge computing application criteria, as one of the following:
determine, based on the comparing, that the mobile edge computing application criteria is not feasible based on a determination that the one or more parameters of the mobile edge computing application criteria violate the one or more constraints associated with the mobile edge computing applications management; and
determine, based on the comparing, that the mobile edge computing application criteria is feasible based on a determination that the one or more parameters of the mobile edge computing application criteria do not violate the one or more constraints associated with the mobile edge computing applications management.

7. The apparatus of claim 1, wherein causing the apparatus to manage at least a portion of a lifecycle of a mobile edge computing application comprises causing the apparatus to at least one of perform and determine whether to perform, one or more of the following based on a comparison of the mobile edge computing application criteria or the revised mobile edge computing application criteria to one or more conditions associated with the lifecycle management of the mobile edge computing application:
  instantiate the mobile edge computing application;
  terminate the mobile edge computing application;
  scale up resources allocated to the mobile edge computing application; and
  scale down resources allocated to the mobile edge computing application.

8. The apparatus of claim 1, wherein the mobile edge computing application criteria or the revised mobile edge computing application criteria comprises at least:
  an application identifier that identifies the mobile edge computing application; and
  a value for one or more parameters for managing at least a portion of a lifecycle of the mobile edge computing application, including an action criteria and an associated action to be performed for the mobile edge computing application if the action criteria is met.

9. The apparatus of claim 1, wherein the mobile edge computing application criteria or the revised mobile edge computing application criteria comprises at least one of the following:
  a first charging rate threshold for determining a range of charging rates, for which the mobile edge computing applications manager is being requested to instantiate the mobile edge computing application;
  a second charging rate threshold for determining a range of charging rates, for which the mobile edge computing applications manager is being requested to scale up resources for the mobile edge computing application;
  a third charging rate threshold for determining a range of charging rates, for which the mobile edge computing applications manager is being requested to scale down resources for the mobile edge computing application; and
  a fourth charging rate threshold for determining a range of charging rates, for which the mobile edge computing applications manager is being requested to terminate the mobile edge computing application.

10. The apparatus of claim 1, wherein the mobile edge computing application criteria or the revised mobile edge computing application criteria comprises a value for one or more of the following parameters for managing at least a portion of a lifecycle of the mobile edge computing application:
  a valid timer parameter that identifies a time period for which the mobile edge computing application criteria is valid;
  a charging rate threshold for determining whether to perform one or more actions or cycles of the lifecycle management of the mobile edge computing application;
  a memory resource, a processing resource, or a bandwidth resource, requested for the mobile edge computing application;
  an amount of bandwidth resources requested for the mobile edge computing application;
  a requested performance for the mobile edge computing application related to at least one of a latency, a minimum bandwidth or data throughput, or a quality of service; and
  a radio network information service (RNIS) information related to a user device or a radio access bearer for the user device.

11. The apparatus of claim 1, wherein the mobile edge computing application criteria or the revised mobile edge computing application criteria specifies a network condition and an associated action to be performed for the mobile edge computing application when the network condition is met, and wherein causing the apparatus to manage at least a portion of a lifecycle of the mobile edge computing application comprises causing the apparatus to:
  determine that the network condition is met; and
  perform the associated action for the mobile edge computing application based on the network condition being met, wherein the associated action includes one of: instantiate the mobile edge computing application, terminate the mobile edge computing application, scale up resources for the mobile edge computing application, and scale down resources for the mobile edge computing application.

12. The apparatus of claim 1, further causing the apparatus to:
  detect a change in network conditions related to at least one of a change in an availability of mobile edge computing server resources or a change in demand for mobile edge computing server resources; and
  send, by the mobile edge computing applications manager to the external applications controller, a revised mobile edge computing application criteria based on the detected change in network conditions.

13. The apparatus of claim 12 wherein causing the apparatus to detect a change in network conditions comprises at least one of:
  detect an increase or decrease in mobile edge computing server resources;
  detect a change in a charging rate(s) to be charged for the mobile edge computing application; and
  detect a change in demand for mobile edge computing server resources based on resource requests for other mobile edge computing applications.

14. An apparatus comprising at least one processor and at least one memory including computer instructions, when executed by the at least one processor, cause the apparatus to:
  send, by an external applications controller to a mobile edge computing applications manager provided on a mobile edge computing server that is in proximity to a radio access network, a first mobile edge computing application criteria that includes management rules for managing at least a portion of a lifecycle of a mobile edge computing application;
  receive, by the external applications controller, a second proposed mobile edge computing application criteria;
  determine a feasibility of the second mobile edge application criteria;
  in response to determining the second mobile edge application criteria are not feasible,
    generate a revised mobile edge application criteria, and
    send the revised mobile edge application criteria to the mobile edge computing applications manager,
  receive a confirmation of the revised mobile edge application criteria;
  in response to determining the second mobile edge application criteria are feasible,
    send a confirmation of the first mobile edge application criteria to the mobile edge computing applications manager; and
  receive an application management report from the mobile edge computing applications manager, wherein the mobile edge computing application criteria or the revised mobile edge computing application criteria comprises at least one of the following:

a first charging rate threshold for determining a range of charging rates, for which the mobile edge computing applications manager is being requested to instantiate the mobile edge computing application;

a second charging rate threshold for determining a range of charging rates, for which the mobile edge computing applications manager is being requested to scale up resources for the mobile edge computing application;

a third charging rate threshold for determining a range of charging rates, for which the mobile edge computing applications manager is being requested to scale down resources for the mobile edge computing application; and a fourth charging rate threshold for determining a range of charging rates, for which the mobile edge computing applications manager is being requested to terminate the mobile edge computing application.

15. The apparatus of claim 14, wherein the proposed or revised mobile edge computing application criteria comprises at least:

an application identifier that identifies the mobile edge computing application; and a value for one or more parameters for managing at least a portion of a lifecycle of the mobile edge computing application, including an action criteria and an associated action to be performed for the mobile edge computing application if the action criteria is met.

16. The apparatus of claim 14, wherein the mobile edge computing application criteria comprises at least one of the following:

a first charging rate threshold for determining a range of charging rates, for which the mobile edge computing applications manager is being requested to instantiate the mobile edge computing application;

a second charging rate threshold for determining a range of charging rates, for which the mobile edge computing applications manager is being requested to scale up resources for the mobile edge computing application;

a third charging rate threshold for determining a range of charging rates, for which the mobile edge computing applications manager is being requested to scale down resources for the mobile edge computing application; and a fourth charging rate threshold for determining a range of charging rates, for which the mobile edge computing applications manager is being requested to terminate the mobile edge computing application.

17. The apparatus of claim 14, wherein the mobile edge computing application criteria comprises a value for one or more of the following parameters for managing at least a portion of a lifecycle of the mobile edge computing application:

a valid timer parameter that identifies a time period for which the mobile edge computing application criteria is valid;

a charging rate threshold for determining whether to perform one or more actions or cycles of the lifecycle management of the mobile edge computing application;

a memory resource, a processing resource, or a bandwidth resource, requested for the mobile edge computing application;

an amount of bandwidth resources requested for the mobile edge computing application;

a requested performance for the mobile edge computing application related to at least one of a latency, a minimum bandwidth or data throughput, or a quality of service; and a radio network information service (RNIS) information related to a user device or a radio access bearer for the user device.

18. An apparatus comprising at least one processor and at least one memory including computer instructions, when executed by the at least one processor, cause the apparatus to:

receive, from an external applications controller, by a mobile edge computing applications manager provided on a mobile edge computing server that is in proximity to a radio access network, a proposed mobile edge computing application criteria that includes management rules for managing at least a portion of a lifecycle of a mobile edge computing application;

determine, by the mobile edge computing applications manager, that the proposed mobile edge computing application criteria is feasible;

send, by the mobile edge computing applications manager to the external applications controller, a confirmation indicating that the proposed mobile edge computing application criteria is feasible; and manage, by the mobile edge computing applications manager, at least a portion of a lifecycle of the mobile edge computing application based on the mobile edge computing application criteria, wherein the mobile edge computing application criteria or a revised mobile edge computing application criteria comprises at least one of the following:

a first charging rate threshold for determining a range of charging rates, for which the mobile edge computing applications manager is being requested to instantiate the mobile edge computing application;

a second charging rate threshold for determining a range of charging rates, for which the mobile edge computing applications manager is being requested to scale up resources for the mobile edge computing application;

a third charging rate threshold for determining a range of charging rates, for which the mobile edge computing applications manager is being requested to scale down resources for the mobile edge computing application; and a fourth charging rate threshold for determining a range of charging rates, for which the mobile edge computing applications manager is being requested to terminate the mobile edge computing application.

* * * * *